US008612740B2

(12) United States Patent
Lee

(10) Patent No.: US 8,612,740 B2
(45) Date of Patent: Dec. 17, 2013

(54) MOBILE TERMINAL WITH A DEDICATED SCREEN OF A FIRST OPERATING SYSTEM (OS) WITH AT LEAST AN ICON TO TOUCH FOR EXECUTION IN A SECOND OS

(75) Inventor: Choongryeol Lee, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 13/025,050

(22) Filed: Feb. 10, 2011

(65) Prior Publication Data

US 2012/0110315 A1  May 3, 2012

(30) Foreign Application Priority Data

Oct. 29, 2010 (KR) ................. 10-2010-0106758

(51) Int. Cl.
*G06F 1/24* (2006.01)
*G06F 9/44* (2006.01)
*G06F 3/048* (2013.01)

(52) U.S. Cl.
USPC .................... 713/100; 719/319; 715/764

(58) Field of Classification Search
USPC ............................................. 713/100
See application file for complete search history.

(56) References Cited

U.S. PATENT DOCUMENTS

| 7,127,723 | B2 * | 10/2006 | Endo et al. ............ 719/319 |
| 7,424,623 | B2 * | 9/2008 | Du et al. ............... 713/300 |
| 7,548,804 | B2 * | 6/2009 | Rossow et al. ......... 701/36 |
| 7,681,134 | B1 | 3/2010 | Grechishkin et al. |
| 7,930,705 | B2 * | 4/2011 | Vo et al. ............... 719/328 |
| 7,975,236 | B1 * | 7/2011 | Grechishkin et al. ...... 715/765 |
| 8,117,554 | B1 * | 2/2012 | Grechishkin et al. ...... 715/764 |
| 2004/0205755 | A1 | 10/2004 | Lescouet et al. |
| 2005/0076326 | A1 * | 4/2005 | McMillan et al. ......... 717/100 |
| 2006/0010433 | A1 | 1/2006 | Neil |
| 2006/0150239 | A1 | 7/2006 | Fujimori et al. |
| 2010/0218197 | A1 * | 8/2010 | Takeuchi ................ 719/319 |
| 2012/0005691 | A1 * | 1/2012 | Wong et al. ............. 719/319 |

FOREIGN PATENT DOCUMENTS

| CN | 1755630 A | 4/2006 |
| CN | 1791862 A | 6/2006 |

* cited by examiner

*Primary Examiner* — Suresh Suryawanshi

(74) *Attorney, Agent, or Firm* — Birch, Stewart, Kolasch & Birch, LLP

(57) ABSTRACT

A method and system for controlling a mobile terminal provided with at least two operating systems. The method includes: displaying an application on a dedicated screen of a first OS (Operating System) among the at least two OSs (Operating Systems); determining that an execution command for the application is input to the dedicated screen of the first OS; determining whether the application is executable in the first OS if the execution command for the application is determined to have been input to the dedicated screen of the first OS; finding, among the at least two OSs in the memory, a second OS capable of executing the application if the first OS is determined not to be able to execute the application; activating the second OS; and executing the application via the activated second OS.

17 Claims, 22 Drawing Sheets

(a)

(b)

(a)        (b)

(c)

(a)

(b)

(a)      (b)

(c)      (d)

(a)  (b)

(c)  (d)

(a)

(b)

(a)  (b)

(c)

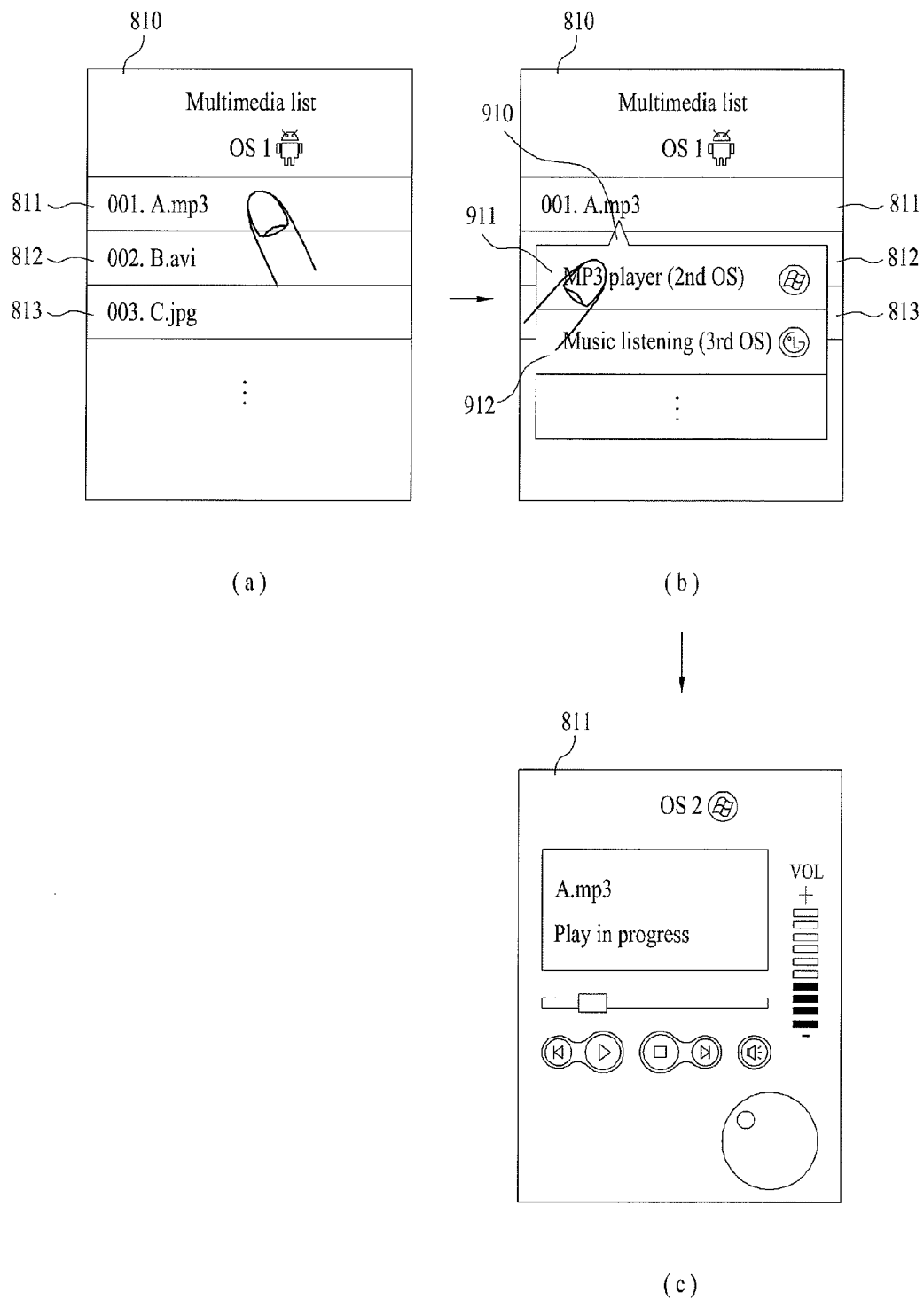

MOBILE TERMINAL WITH A DEDICATED SCREEN OF A FIRST OPERATING SYSTEM (OS) WITH AT LEAST AN ICON TO TOUCH FOR EXECUTION IN A SECOND OS

CROSS REFERENCE TO RELATED APPLICATIONS

Pursuant to 35 U.S.C. §119(a), this application claims the benefit of earlier filing date and right of priority to Korean Application No. 10-2010-0106758, filed on Oct. 29, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As mobile terminals for using such a multimedia service, various kinds of smart phones capable of executing various application functions are ongoing to be released.

Such a mobile terminal as a smart phone is loaded with an operating system (hereinafter abbreviated OS) for supporting executions of various applications, voice/data communications, interoperability with PC and the like.

Currently, operating systems loaded on smart phones include Android OS released by Google, Windows Mobile OS released by Microsoft, I-OS released by Apple and the like.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. In particular, in case that a mobile terminal is provided with at least two operating systems, if an application selected from a screen is not executable within a currently activated OS, the currently activated OS is switched to an OS capable of executing the selected application to execute the corresponding application.

Another object of the present invention is to provide a mobile terminal and controlling method thereof. In particular, when a specific multimedia content is selected, applications dedicated to each OS capable of executing the selected specific multimedia content are displayed. If a specific application is selected, a current OS is switched to an OS for the selected application to execute the corresponding application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory provided with at least two OSs (Operating Systems) and at least one application, a display unit configured to display the application on a dedicated screen of a specific first OS (Operating System) among the OSs, a controller controlling operations related to the OSs and the at least one application, wherein the controller configured to determine whether the first OS is able to execute the application if an execution command for the application is inputted to the first OS dedicated screen, to search at least one second OS (Operating System) for executing the application in the memory if the first OS is not able to execute the application, to activate the searched second OS, and to execute the application via the activated second OS.

In another aspect of the present invention, a method of controlling a mobile terminal provided with at least two operating systems includes the steps of displaying at least one application on a dedicated screen of a specific first OS (Operating System) among the at least two OSs (Operating Systems), determining whether the application is executable in the first OS if an execution command for the application is inputted, searching at least one second OS (Operating System) for executing the application among the OSs if the application is inexecutable in the first OS, activating the searched second OS, executing the application via the activated second OS.

In a further aspect of the present invention, a mobile terminal includes a memory provided with at least two OSs (Operating Systems) and at least one application dedicated to the OSs, a display unit configured to display at least one content on a screen, a controller controlling operations related to the OSs, the at least one application and the at least one content, wherein the controller searches at least one application available for an execution of a selected content in the memory and displays the found at least one or more applications, wherein if the searched application is selected, the controller executes the selected application by activating an OS (Operating System) dedicated to the selected application, wherein the controller executes the selected content via the executed application.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 22 is a diagram of screen configurations of a process for executing a content according to a second embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
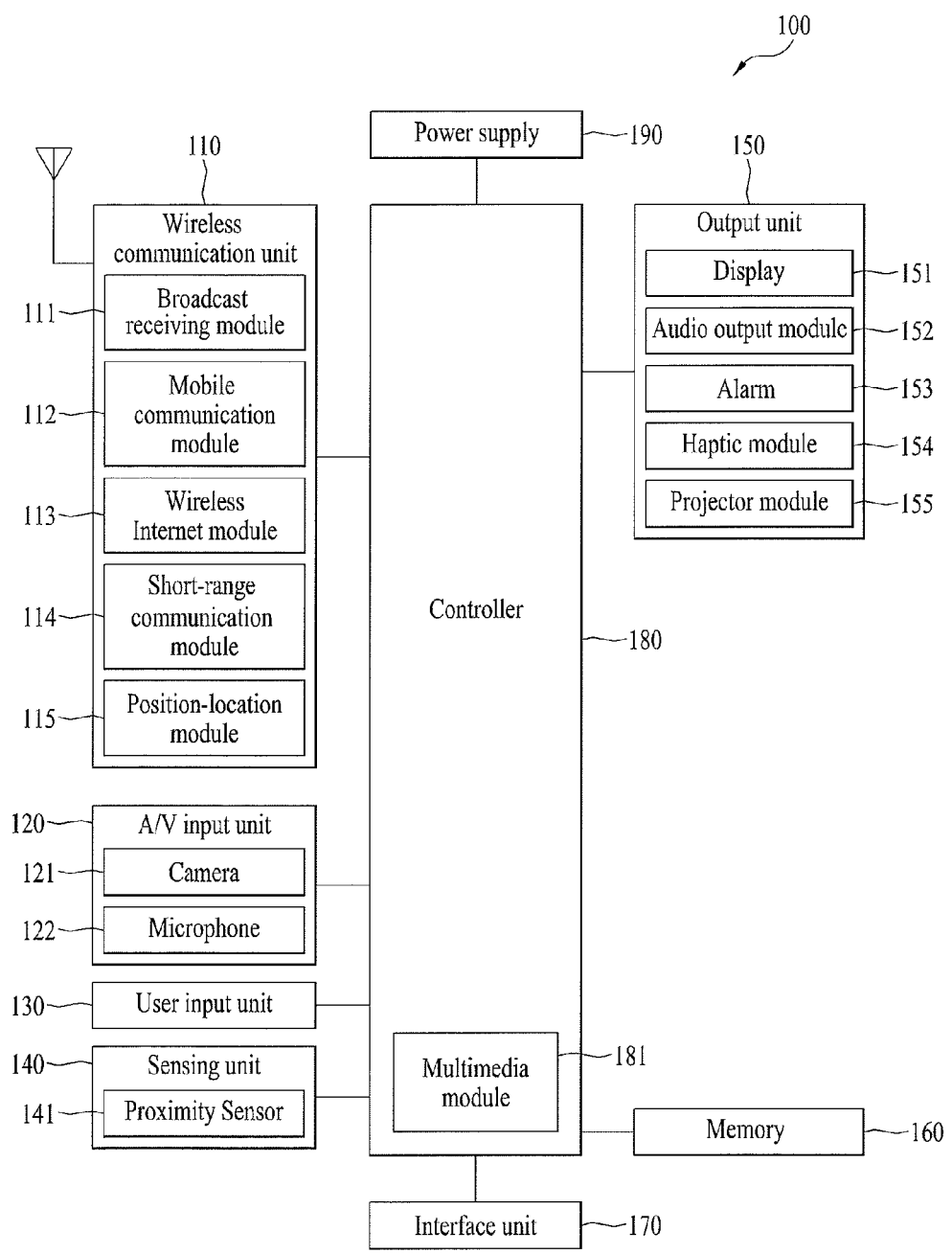
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is possible to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is possible to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, the touchscreen is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, the memory 160 is provided with a plurality of operating systems and applications dedicated to each of the operating systems. For instance, the operating systems can include Android based OS, Linux based OS, Windows Mobile based OS, and Apple based OS and the like.

The operating systems are selectively drivable one by one or can be driven entirely and simultaneously, under the control of the controller 180.

The applications are driven according to a platform of each operating system. Each of the applications is provided to execute a specific function. And, the applications are displayed as icons on the screen. For instance, the applications provide various functions of compass, enhanced reality, camera, video player, music player, game, news, web browser and the like.

The applications can be provided as defaults in the memory 160 of the mobile terminal 100 or can be downloaded from a website or an external terminal.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that the mobile terminal 100 is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

Figure 3:
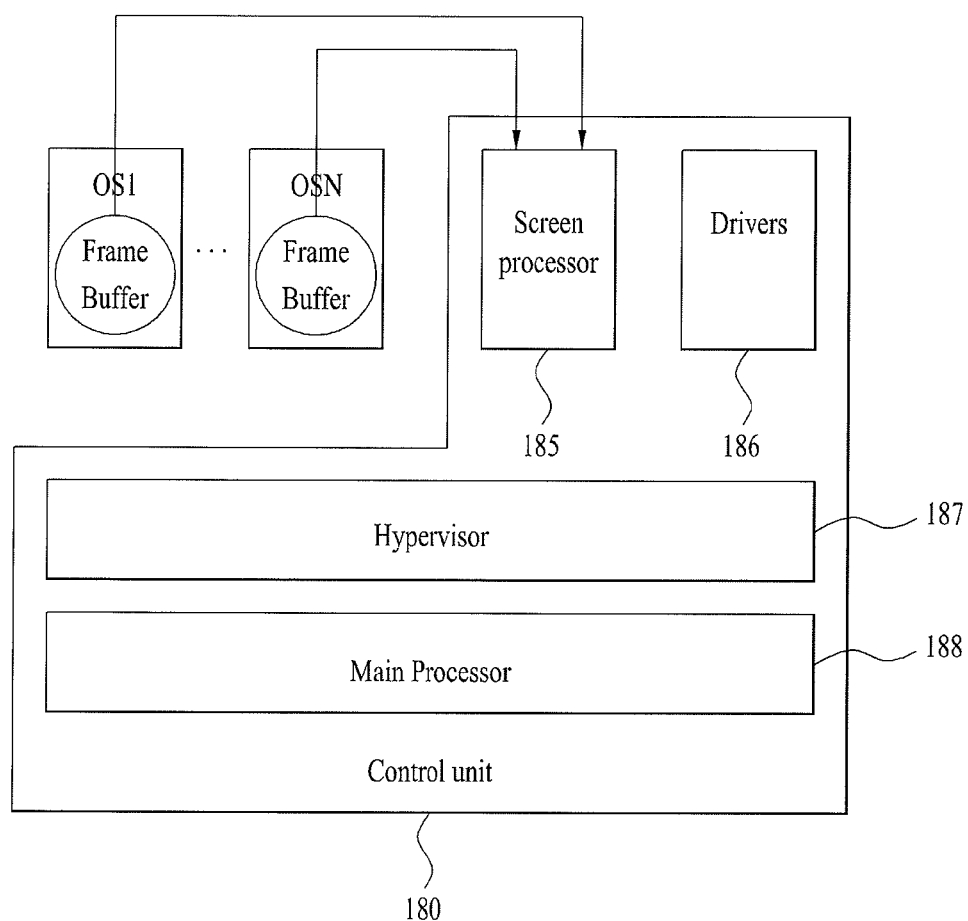
FIG. 3 is a block diagram of a control unit for driving multiple operating systems and displaying dedicated screens of all operating system within a single screen according to the present invention.
Figure 4:
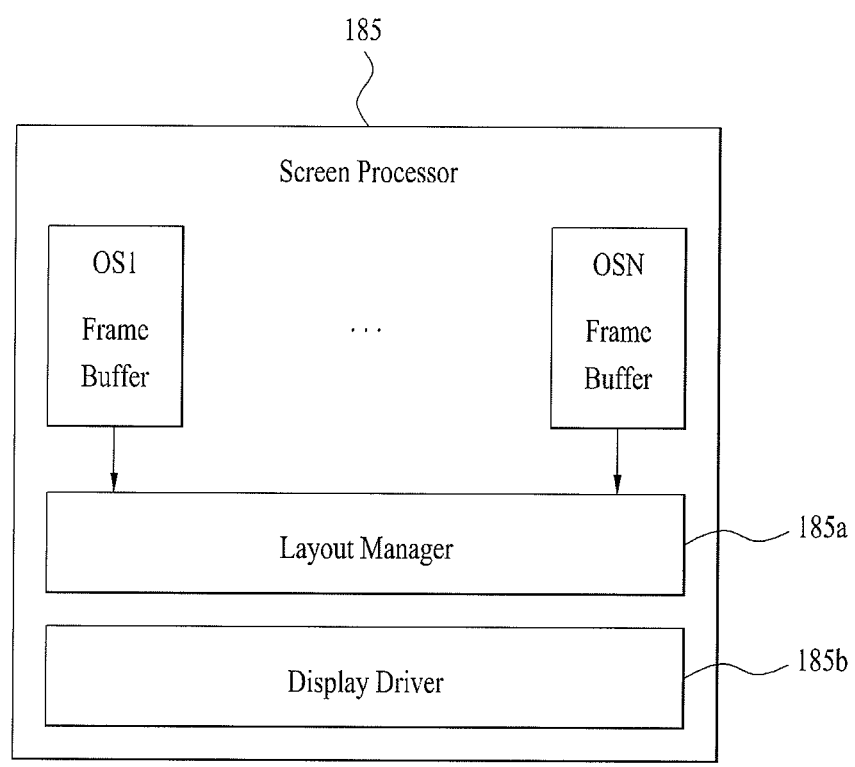
FIG. 4 is a block diagram of a screen processor shown in FIG. 3.

Moreover, the controller 180 is able to include components for driving at least two operating systems and components for performing operations related to dedicated screens of the driven operating systems, as shown in FIG. 3 and FIG. 4, according to the present invention.

FIG. 3 is a block diagram of a control unit for driving multiple operating systems and displaying dedicated screens of all operating system within a single screen according to the present invention.

FIG. 4 is a block diagram of a screen processor shown in FIG. 3.

Referring to FIG. 3 and FIG. 4, the controller 180 of the present invention includes a screen processor 185, a driver 186, a hypervisor 187 and a main processor 188.

Frame buffers are provided to all operating systems provided within the memory 160, respectively. If the operating systems are driven, the screen processor 185 receives frames corresponding to dedicated screens of the corresponding operating systems from the frame buffers of the operating systems, respectively. Under the control of the control of the main processor 188, the screen processor 185 then determines which one of the OS dedicated screens will be displayed on a current screen of the display unit 151.

In particular, under the control of the main processor 188, the screen processor 185 displays the dedicated screen of the specific operating system on a whole screen of the display unit 151. Alternatively, the screen processor 185 is able to generate one unified frame by combining or editing the frames received from the frame buffers. In this case, the unified frame includes a screen image containing all of the operating systems of the present invention.

The screen processor 185 includes a layout manager 185*a* and a display driver 185*b*. In particular, the layout manager 185*a* generates one unified frame by combining or editing the frames received from the frame buffers. And, the display driver 185*b* controls the frame generated by the layout manager 185*a* to *b* displayed on the display unit 151.

The driver 186 controls the entire operating systems to be driven.

The hypervisor 187 is a middleware between the main processor 188 and the operating systems and corresponds to a virtualization engine enabling a plurality of operating systems to be available for the mobile terminal 100 according to the present invention.

The main processor 188 controls overall operations related to the multiple OS driving according to the present invention.

The screen processor 185, the driver 186, the hypervisor 187 and the main processor 188 can be included in the controller 180. Alternatively, they can be provided as software within the memory 160.

In the following description, assume that the screen processor 185, the driver 186, the hypervisor 187 and the main processor 188 are unified together within the controller 180.

Figure 5:
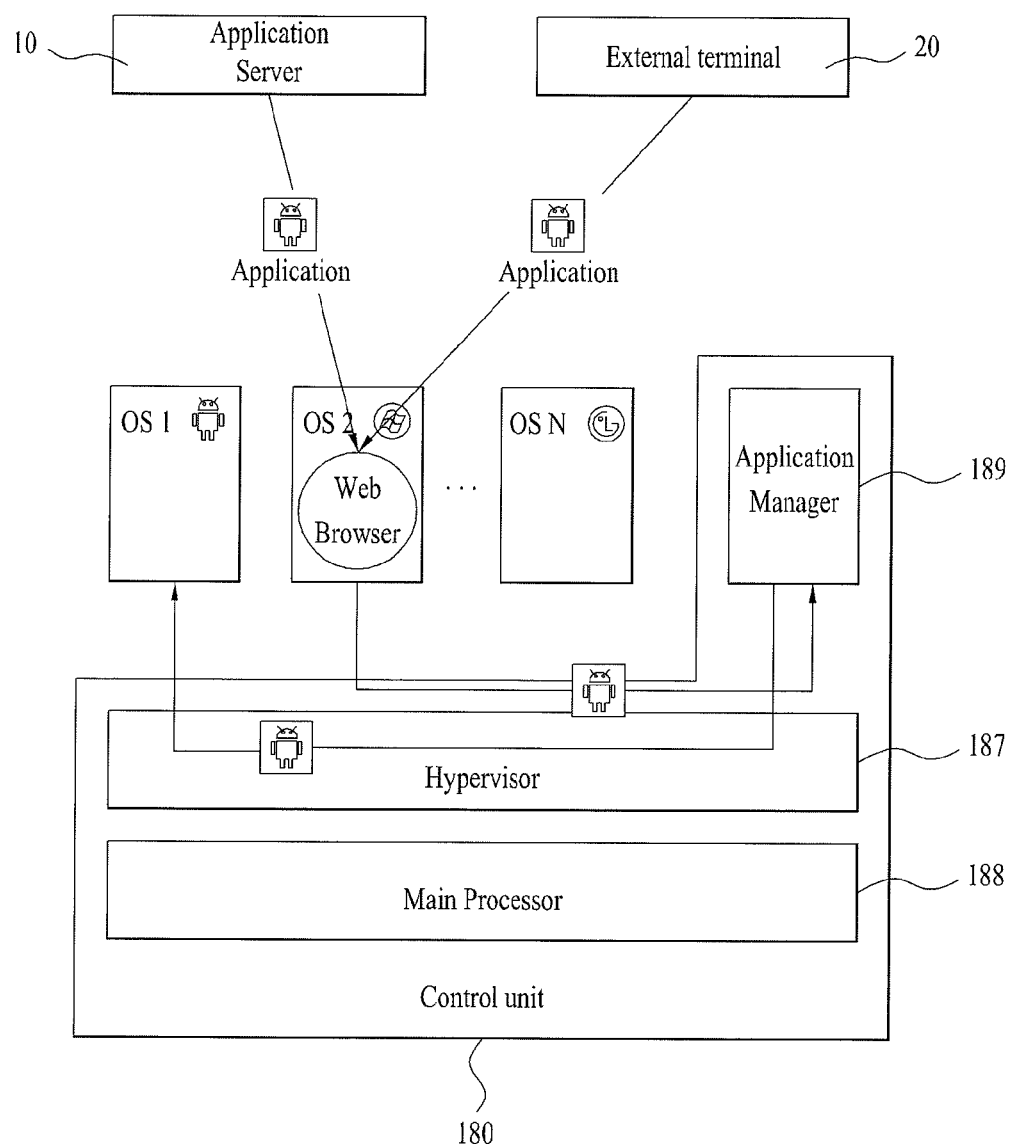
FIG. 5 is a block diagram of a control unit having an application manager for management of an application obtained externally.

In case that an application obtained from an external environment 10/20 in a specific first OS environment is dedicated to a second OS different from a first OS, as shown in FIG. 5, the controller 180 of the present invention controls the downloaded application dedicated to the second OS to be stored in a second OS application list within the memory 160 and is then able to manage the stored application via an application manager 189 shown in FIG. 5.

FIG. 5 is a block diagram of a control unit having an application manager for management of an application obtained externally.

Referring to FIG. 5, the controller 180 of the present invention is able to further include an application manager 189 in addition to the configurations shown in FIG. 3 and FIG. 4.

In particular, under the control of the main processor 188, the hypervisor 187 determines an operating system available for the execution of the application downloaded from the external environment 10/20 and then transmits the downloaded application and information on the downloaded application executable OS to the application manager 189.

Subsequently, based on the information on the application OS received from the hypervisor 187, the application manager 189 enables the downloaded application to be stored in a corresponding OS application list.

Optionally, the above-configured application manager 189 is included in the controller 180 or can be provided as software within the memory 160.

In the following description, assume that the screen processor 185, the driver 186, the hypervisor 187, the main processor 188 and the application manager 189 are unified together within the controller 180.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
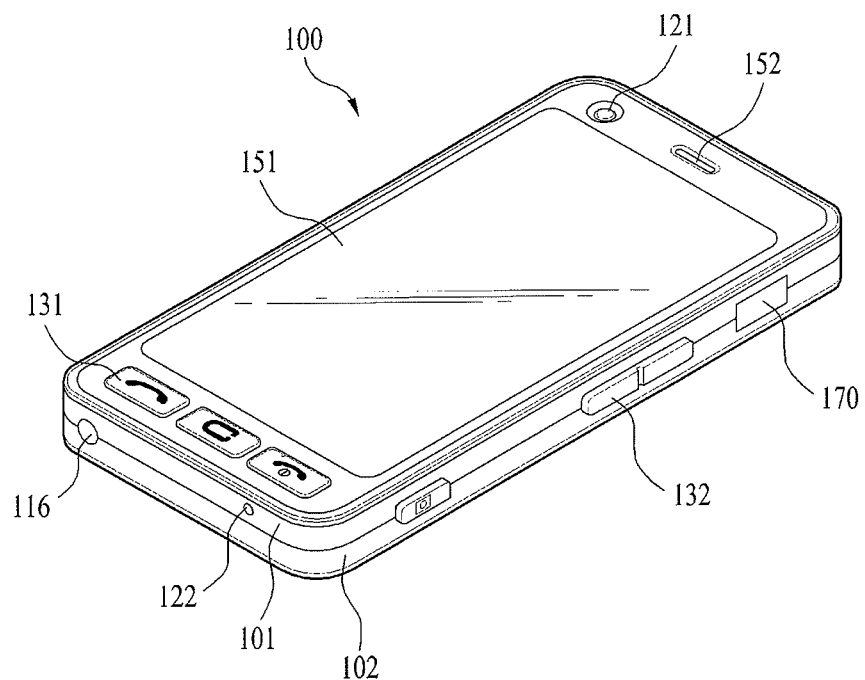
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof.

For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
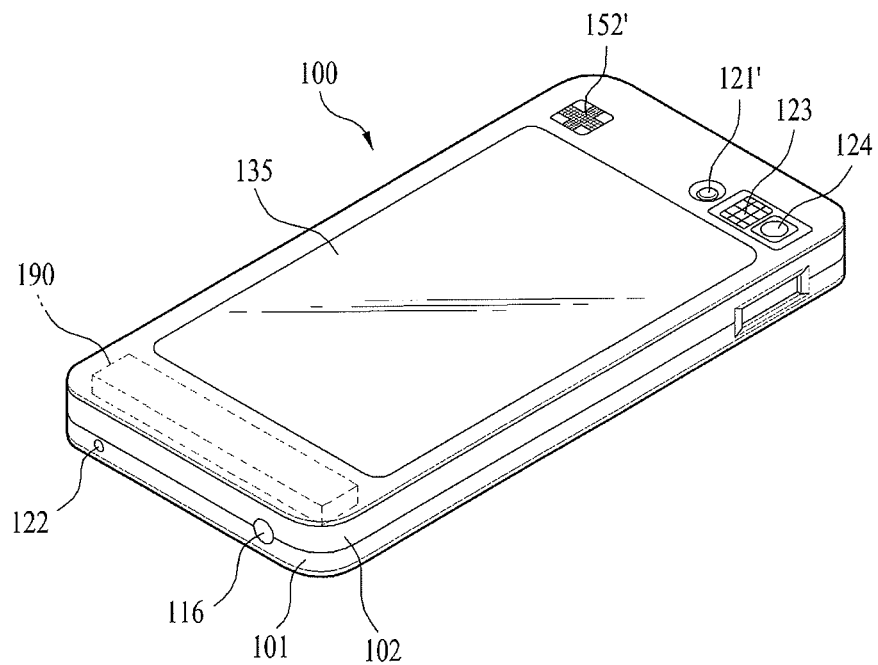
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, the display 151 is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, preferred embodiments of the present invention are explained with reference to FIGS. 6 to 22.

First of all, a first embodiment of the present invention is described with reference to FIGS. 6 to 20.

First Embodiment

A first embodiment of the present invention relates to a process for executing an application. In particular, while at least two operating systems are provided to the memory 160, if an application selected from a specific first OS dedicated screen is not executable within a currently activated first OS, the controller 180 of the mobile terminal switches the first OS to a second OS available for an execution of the corresponding application and then executes the corresponding application in the second OS.

In the following description, a process for obtaining an application from an application server 10 or an external terminal 20 for providing an application download is explained with reference to FIGS. 6 to 13.

Embodiment 1-1

According to an embodiment 1-1 of the present invention, an application is obtained from a website of an application server 10 providing an application download. If an execution of the obtained application is not possible within a currently activated first OS, the first OS is switched to a second OS available for the execution of the obtained application. Thus, the obtained application can be executed.

A process according to an embodiment 1-1 of the present invention is explained with reference to FIGS. 6 to 9 as follows.

Figure 6:
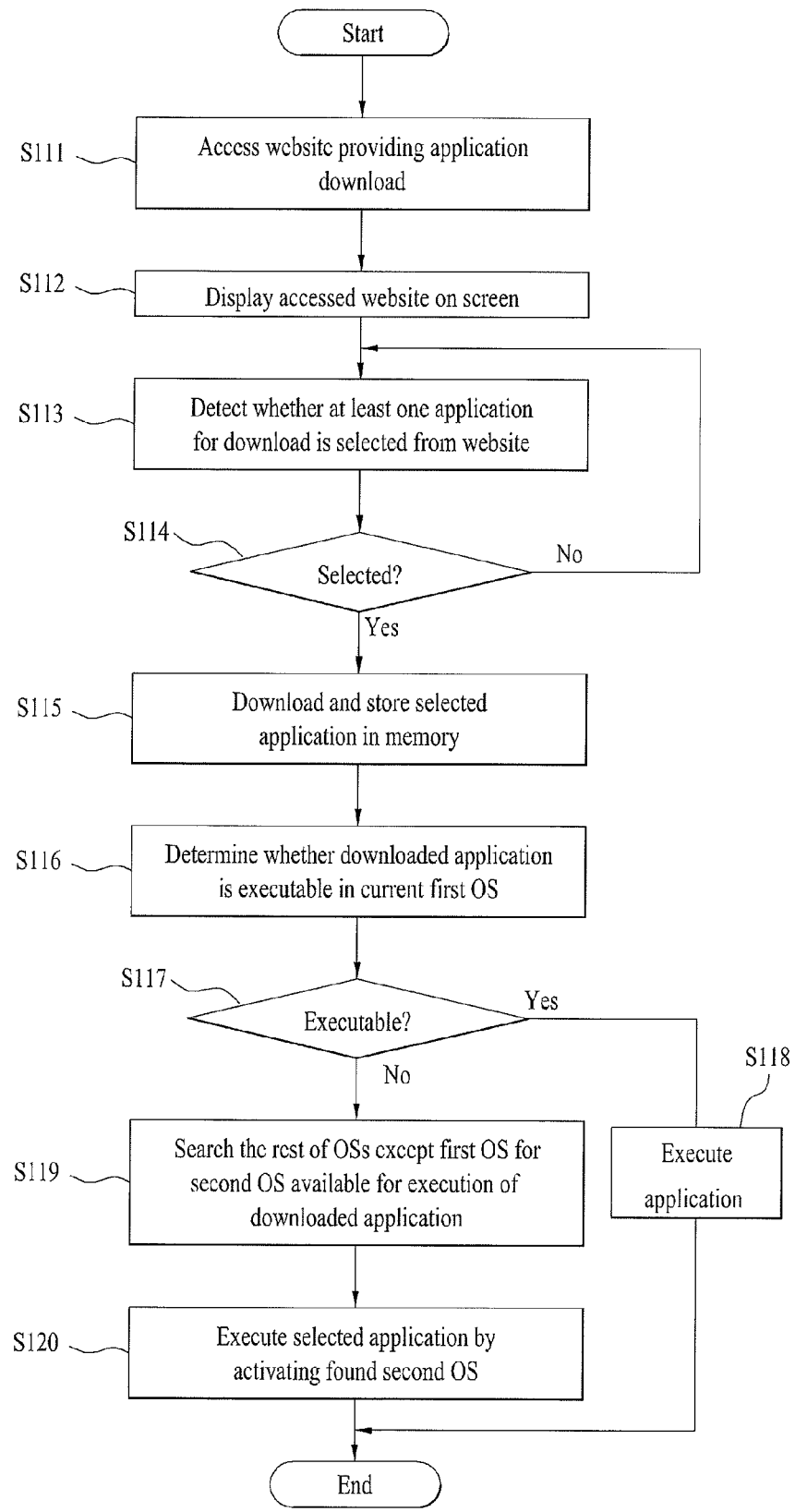
FIG. 6 is a flowchart of a process for obtaining an application from a website of an application server providing an application download according to an embodiment 1-1 of the present invention.

FIG. 6 is a flowchart of a process for obtaining an application from a website of an application server providing an application download according to an embodiment 1-1 of the present invention.

Figure 7:
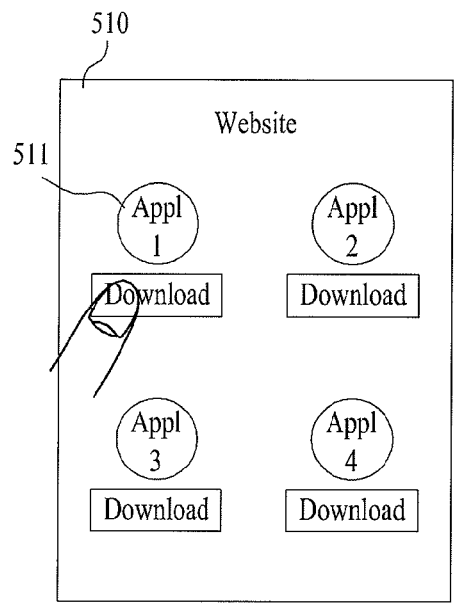
FIGS. 7 to 9 are diagrams of screen configurations of a process for obtaining an application from a website of an application server providing an application download according to an embodiment 1-1 of the present invention.
Figure 7:
Figure 7:
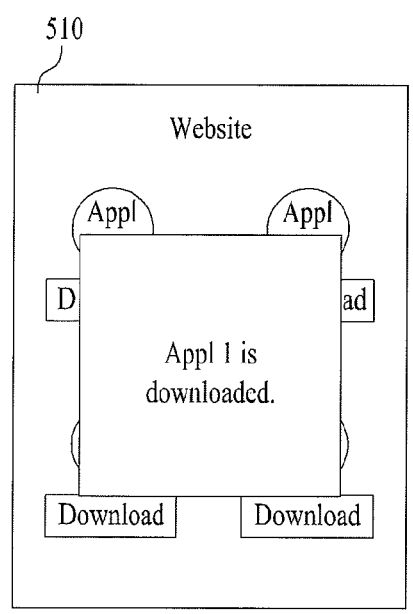
Figure 8:
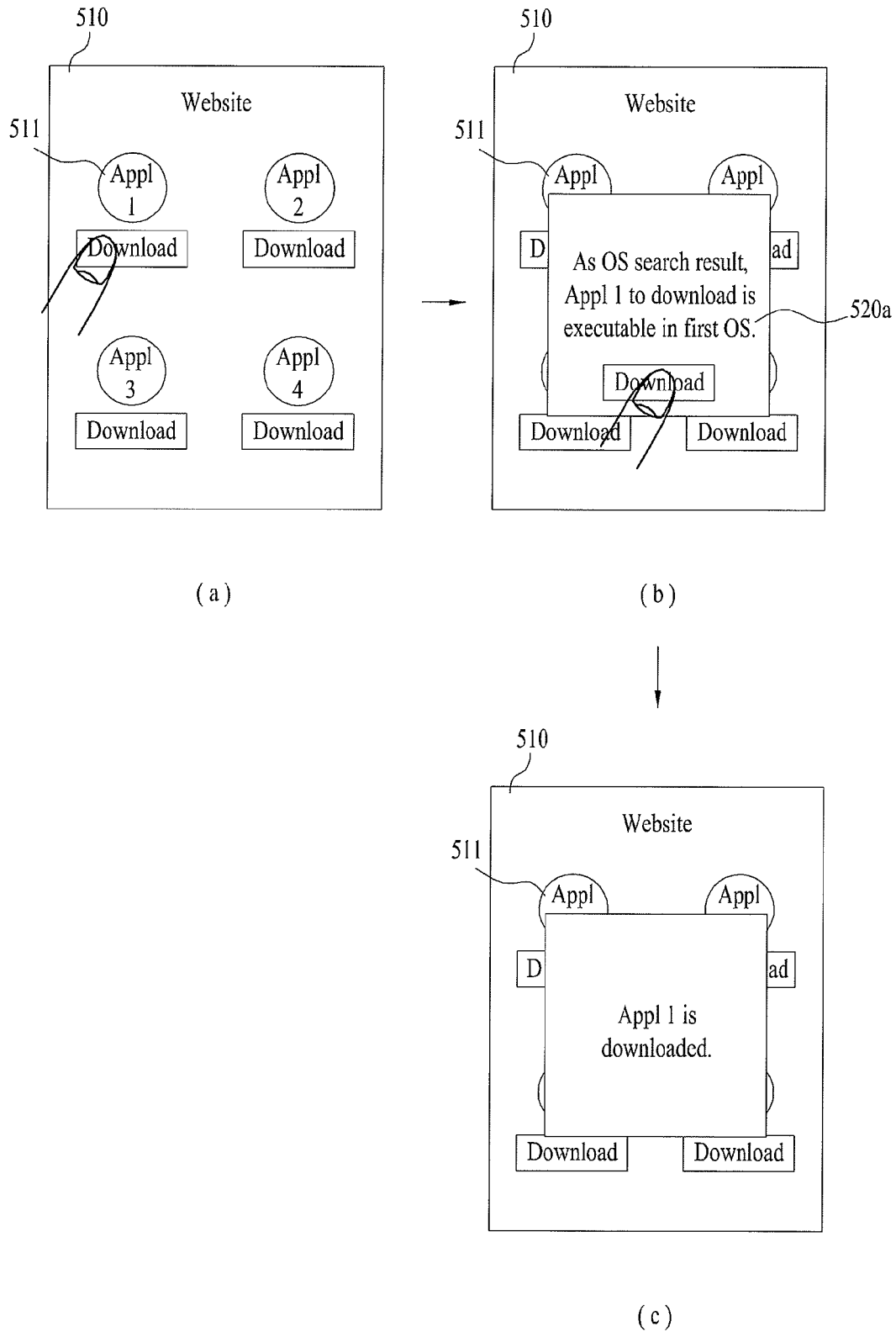
Figure 9:
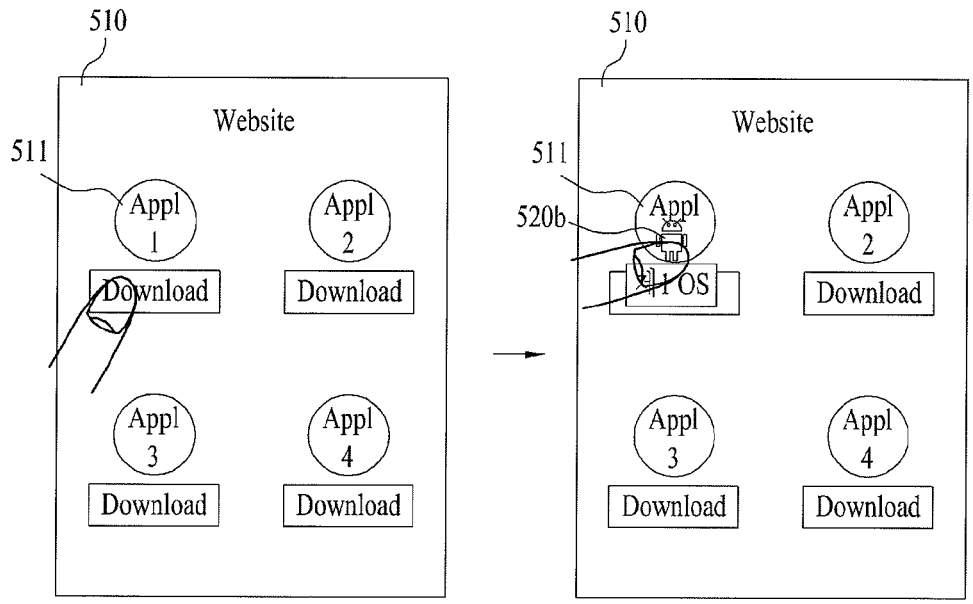
Figure 9:
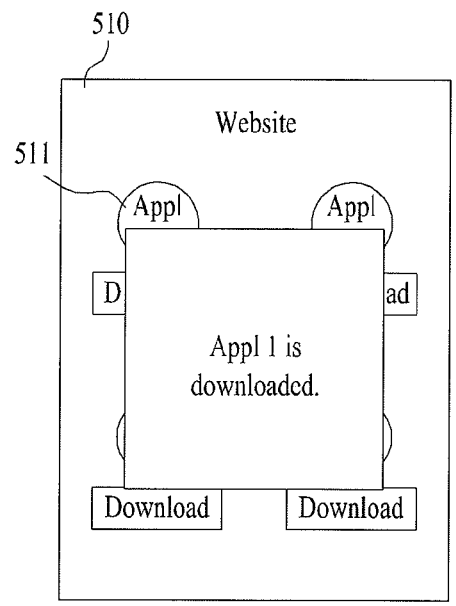

FIGS. 7 to 9 are diagrams of screen configurations of a process for obtaining an application from a website of an application server providing an application download according to an embodiment 1-1 of the present invention.

Referring to FIG. 6 and FIG. 7, while a specific first OS is activated among all operating systems provided within the memory 160, the controller 180 accesses a website 510 of an application server 10 providing an application download via the wireless communication unit 110 according to a request made by a user in an environment of the first OS [S111] and then displays a screen 510 of the accessed website 510 [FIG. 7 (a)].

In case that terminals having subscribed to a service access the application server 10, the website 510 is provided by the application server 10 granting the application download to the corresponding terminals.

The controller 180 detects whether a command for a download of at least one application 511 among a plurality of applications contained in the website screen 510 is inputted [S113].

In doing so, the applications and icons for downloads of the applications are displayed on the website 510. And, the download command can be the selection performed on the corresponding icon.

If the download command is inputted [S114], the controller 180 downloads the at least one application 511 corresponding to the download command via the wireless communication unit 110 and then controls the downloaded at least one application 511 to be stored in the memory 160 [S115] [FIG. 7 (b)].

In this case, an application list dedicated to each OS is provided within the memory 160. The controller 180 searches the memory 160 for at least one OS enabling an execution of the downloaded application 511 and is then able to add the downloaded application 511 to the application list of the found OS.

Alternatively, an application storage space dedicated to each OS is provided in the memory 160. The controller 180 searches the memory 160 for at least one OS enabling an execution of the downloaded application 511 and is then able to control the downloaded application 511 to be stored in the application storage space of the found OS.

Moreover, when the downloaded application 511 is stored in the memory 160, the controller 180 is able to control information indicating the OS enabling the execution of the application 511 to be stored together with the downloaded application 511.

In particular, when the downloaded application 511 is executed, the controller 180 is able to control the information indicating the stored OS, which was stored together with the application 511, to be displayed on a portion of an executed screen of the application 511. When the stored application 511 is displayed as an icon on the screen, the controller 180 is able to control the information indicating the OS, which was stored together with the application 511, to be displayed within the icon of the application 511. And, the controller 180 is able to control the information indicating the OS, which as stored together with the application, to be written in a name of the stored application 511.

Referring to FIG. 8 and FIG. 9, if a command for the download of the application 511 is inputted, the controller 180 searches the operating systems in the memory 160 for the OS enabling the execution of the application 511 to download, displays information indicating the found OS, and is then able to download the application 511 according to a selection made by a user.

In particular, if the application 511 to download is selected [FIG. 8 (a)], the controller 180 searches the memory 160 for the OS enabling the execution of the selected application 511 [FIG. 8 (*b*)], and is then able to control a first information 520*a* indicating the found OS to be displayed on the website screen 510. In this case, the first information 520*a* can become a text information on the found OS.

If the first information 520*a* is selected or a download icon of the first information 520*a* is selected, referring to FIG. 8 (*c*), the controller 180 downloads the selected application 511.

If the application 511 to download is selected [FIG. 9 (*a*)], the controller 180 searches the memory 160 for the OS enabling the execution of the selected application 511 [FIG. 9 (*b*)], and is then able to control a second information 520*b* indicating the found OS to be displayed on the website screen 510. In this case, the second information 520*b* can become such an image information as an icon indicating the found OS, a unique symbol of the found OS and the like.

If the second information 520*b* is selected, referring to FIG. 9 (*c*), the controller 180 downloads the selected application 511.

The controller 180 determines whether the downloaded application 511 is currently executable in a first OS environment [S116].

In particular, if the downloaded application 511 is prepared based on the first OS, it is apparent to those skilled in the art that the downloaded application 511 can be executed in the environment of the first OS. If the downloaded application 511 is prepared based on another OS, it is apparent to those skilled in the art that it is impossible for the downloaded application 511 to be executed in the environment of the first OS.

As a result of the determination in the step S116, if the corresponding execution is possible in the environment of the first OS, the controller 180 executes the function of the downloaded application 511 [S118].

As a result of the determination in the step S116, if the corresponding execution is impossible in the environment of the first OS [S117], the controller 180 searches the operating systems provided within the memory 160 for a second OS enabling the execution of the downloaded application 511 [S119].

The controller 180 then executes the selected application 511 by activating the found second OS [S120].

In doing so, the controller 180 drives the entire operating systems. While the entire operating systems keep being driven, the controller 180 activates the second OS and is then able to control an executed screen of the application to be displayed within the dedicated screen of the first OS.

While the first OS among the entire operating systems is driven only, if the first OS fails to execute the downloaded application 511, the controller 180 turns off the driving of the first OS, drives the second OS, and is then able to control an executed screen of the application 511 to be displayed within the dedicated screen of the second OS.

Embodiment 1-2

According to an embodiment 1-2 of the present invention, an application is obtained from an external terminal 20 providing an application download. If an execution of the obtained application is not possible within a currently activated first OS, the first OS is switched to a second OS available for the execution of the obtained application. Thus, the obtained application can be executed.

A process according to an embodiment 1-2 of the present invention is explained with reference to FIGS. 10 to 13 as follows.

Figure 10:
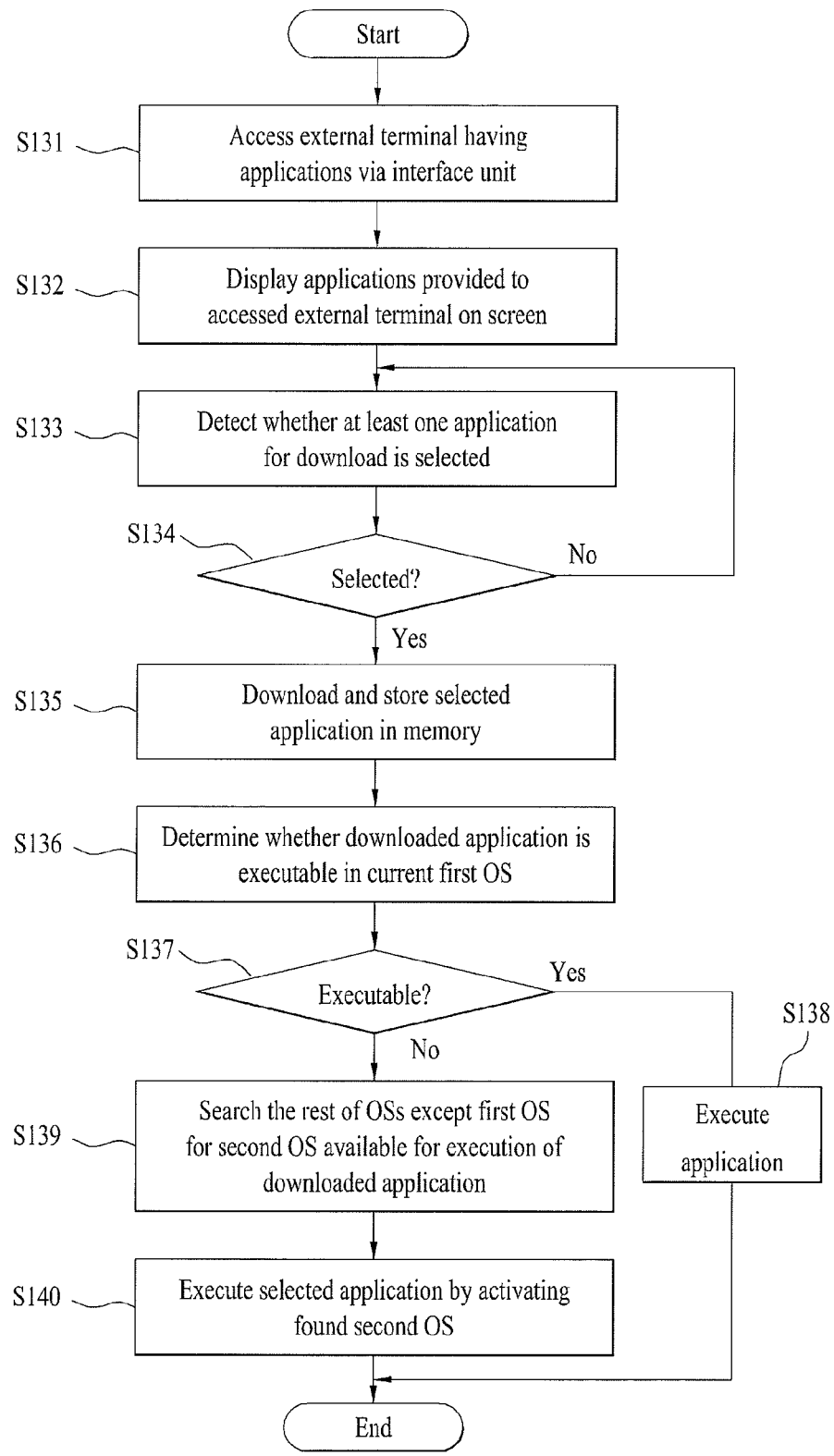
FIG. 10 is a flowchart of a process for obtaining an application from an external terminal providing an application download according to an embodiment 1-2 of the present invention.

FIG. 10 is a flowchart of a process for obtaining an application from an external terminal providing an application download according to an embodiment 1-2 of the present invention.

Figure 11:
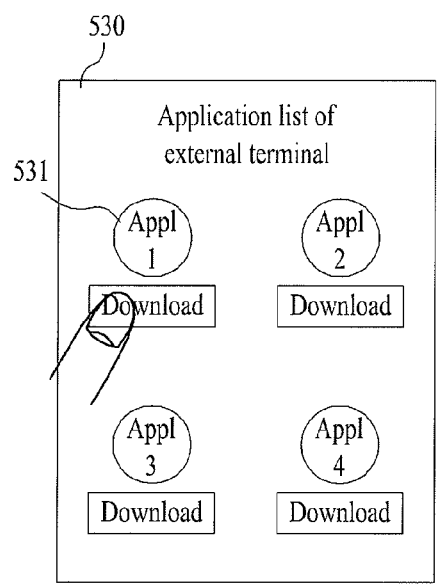
FIGS. 11 to 13 are diagrams of screen configurations of a process for obtaining an application from an external terminal providing an application download according to an embodiment 1-2 of the present invention.
Figure 11:
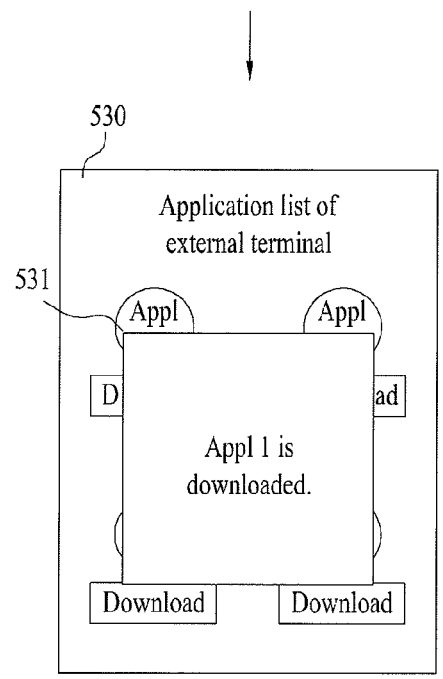
Figure 12:
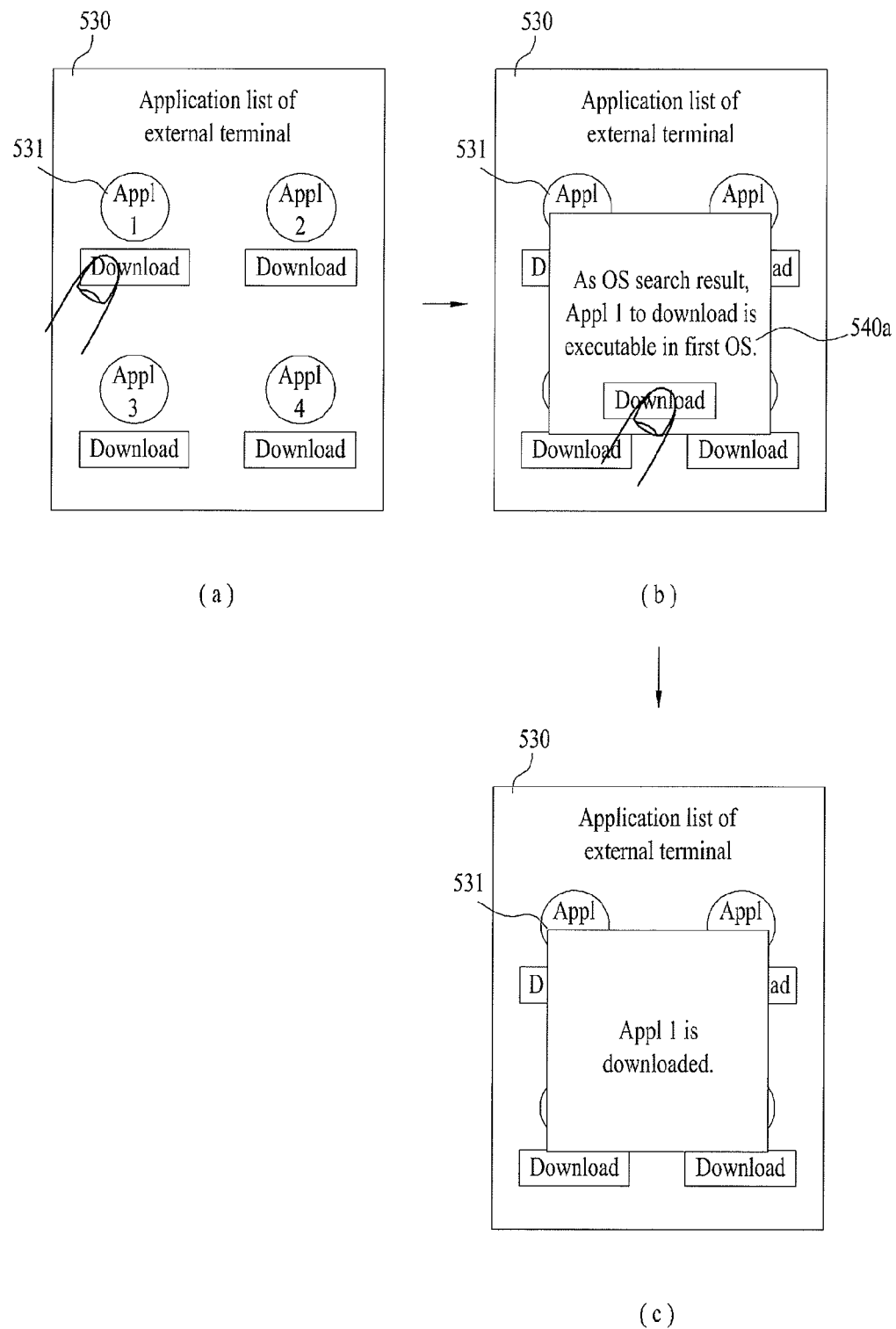
Figure 13:
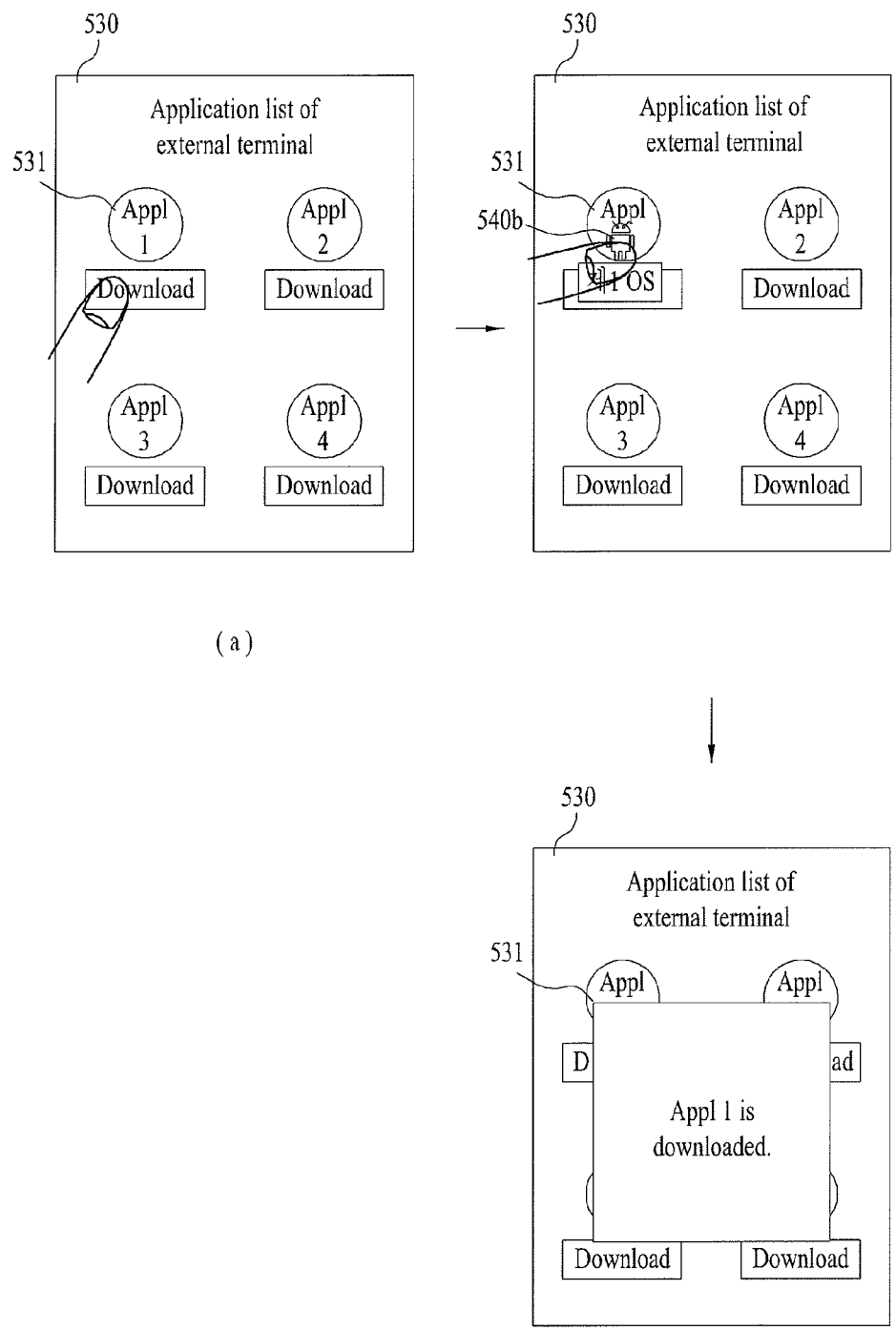

FIGS. 11 to 13 are diagrams of screen configurations of a process for obtaining an application from an external terminal providing an application download according to an embodiment 1-2 of the present invention.

Referring to FIG. 10 and FIG. 11, the controller accesses an external terminal 20 provided with a plurality of applications via the interface unit 170 [S131] and then displays a list screen 530 of the applications provided to the accesses external terminal 20 [S132] [FIG. 11 (*a*)].

In doing so, the mobile terminal 100 according to the present invention can be connected to the external terminal 20 by wire via the interface unit 170, a data cable and the like. If the mobile terminal 100 is connected to the external terminal 20 by wire, the controller 180 is able to view and download the shared applications from the connected external terminal 20.

The controller 180 detects whether at least one application 531 to download is selected from the applications included in the list screen 530 [S133].

If the application 531 to download is selected [S134], the controller 180 downloads the selected application 531 via the interface unit 170 and then controls the downloaded application 531 to be stored in the memory 160 [FIG. 11 (*b*)].

In this case, an application list dedicated to each OS is provided within the memory 160. The controller 180 searches the memory 160 for at least one OS enabling an execution of the downloaded application 531 and is then able to add the downloaded application 531 to the application list of the found OS.

Alternatively, an application storage space dedicated to each OS is provided in the memory 160. The controller 180 searches the memory 160 for at least one OS enabling an execution of the downloaded application 531 and is then able to control the downloaded application 531 to be stored in the application storage space of the found OS.

Moreover, when the downloaded application 531 is stored in the memory 160, the controller 180 is able to control information indicating the OS enabling the execution of the application 531 to be stored together with the downloaded application 531.

In particular, when the downloaded application 531 is executed, the controller 180 is able to control the information indicating the stored OS, which was stored together with the application 531, to be displayed on a portion of an executed screen of the application 531. When the stored application 511 is displayed as an icon on the screen, the controller 180 is able to control the information indicating the OS, which was stored together with the application 531, to be displayed within the icon of the application 531. And, the controller 180 is able to control the information indicating the OS, which as stored together with the application, to be written in a name of the stored application 531.

Referring to FIG. 12 and FIG. 13, if the application 531 to download is selected, the controller 180 searches the operating systems in the memory 160 for the OS enabling the execution of the application 511 to download. The controller displays the information indicating the found OS and is then able to download the application 531 according to a selection made by a user.

In particular, if the application 531 to download is selected [FIG. 12 (*a*)], the controller 180 searches the memory 160 for the OS enabling the execution of the selected application 531 [FIG. 12 (*b*)], and is then able to control a third information 540a indicating the found OS to be displayed on the list screen 530. In this case, the third information 540a can become a text information on the found OS.

If the third information 540a is selected or a download icon of the third information 540a is selected, referring to FIG. 12 (c), the controller 180 downloads the selected application 531.

If the application 531 to download is selected [FIG. 13 (a)], the controller 180 searches the memory 160 for the OS enabling the execution of the selected application 531 [FIG. 13 (b)], and is then able to control a fourth information 540b indicating the found OS to be displayed on the list screen 530. In this case, the fourth information 540b can become such an image information as an icon indicating the found OS, a unique symbol of the found OS and the like.

If the fourth information 540b is selected, referring to FIG. 13 (c), the controller 180 downloads the selected application 531.

The controller 180 determines whether the downloaded application 531 is currently executable in a first OS environment [S136].

In particular, if the downloaded application 531 is prepared based on the first OS, it is apparent to those skilled in the art that the downloaded application 531 can be executed in the environment of the first OS. If the downloaded application 531 is prepared based on another OS, it is apparent to those skilled in the art that it is impossible for the downloaded application 531 to be executed in the environment of the first OS.

As a result of the determination in the step S136, if the corresponding execution is possible in the environment of the first OS, the controller 180 executes the function of the downloaded application 531 [S138].

As a result of the determination in the step S136, if the corresponding execution is impossible in the environment of the first OS [S137], the controller 180 searches the operating systems provided within the memory 160 for a second OS enabling the execution of the downloaded application 531 [S139].

The controller 180 then executes the selected application 531 by activating the found second OS [S140].

In doing so, the controller 180 drives the entire operating systems. While the entire operating systems keep being driven, the controller 180 activates the second OS and is then able to control an executed screen of the application to be displayed within the dedicated screen of the first OS.

While the first OS among the entire operating systems is driven only, if the first OS fails to execute the downloaded application 531, the controller 180 turns off the driving of the first OS, drives the second OS, and is then able to control an executed screen of the application 531 to be displayed within the dedicated screen of the second OS.

In the above description, the application obtaining process and the application executing process according to the present invention are explained in detail with reference to FIGS. 6 to 13.

In the following description, the first embodiment of the present invention continues to be explained with reference to FIGS. 14 to 20.

Embodiment 1-3

According to an embodiment 1-3 of the present invention, if an execution of a previously provided application is not possible within a current OS, the current OS is switched to an OS available for the execution of the corresponding application. Thus, the corresponding application can be executed.

A process according to an embodiment 1-3 of the present invention is explained with reference to FIG. 14 and FIG. 15 as follows.

Figure 14:
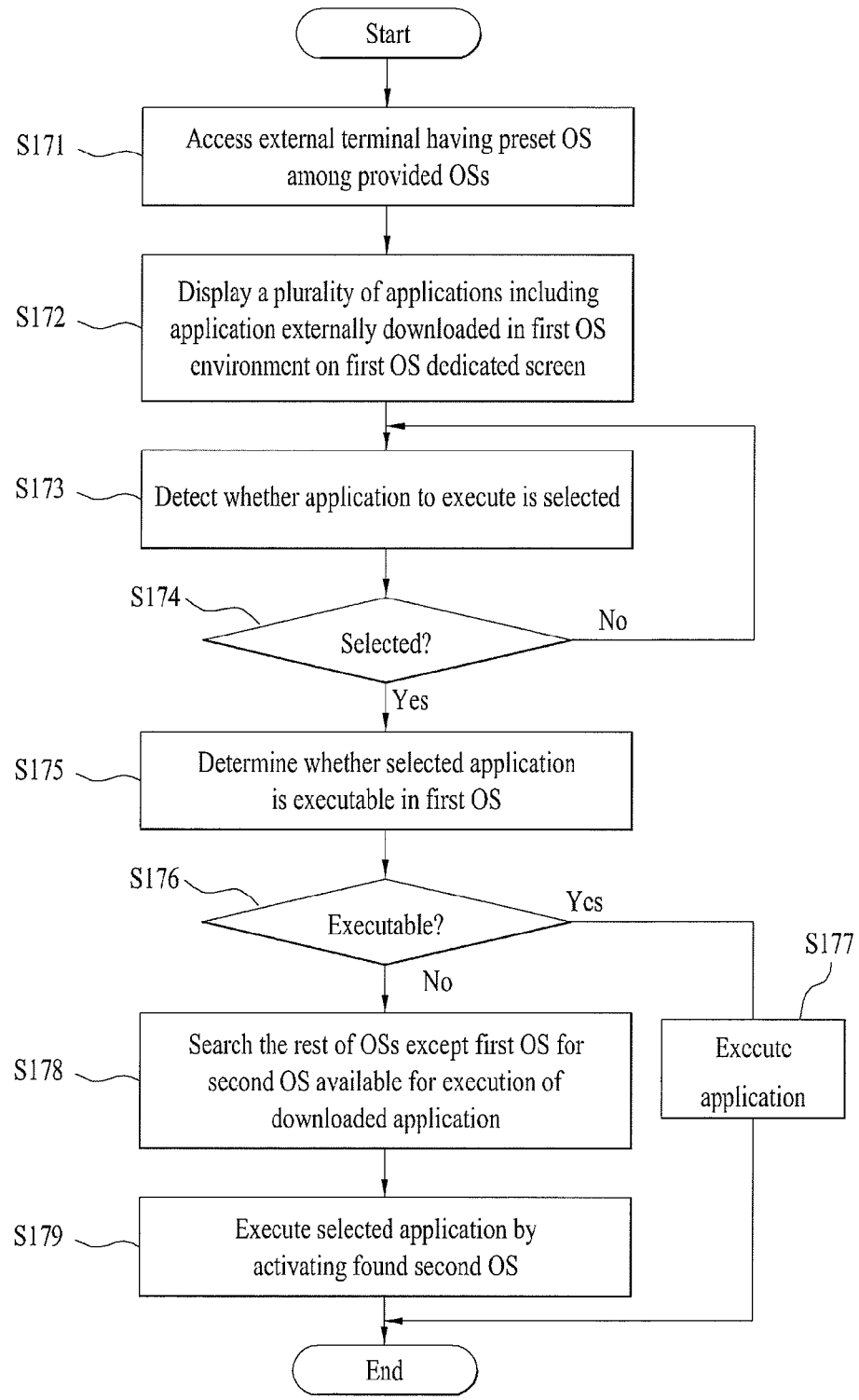
FIG. 14 is a flowchart of a process for executing a previously provided application according to an embodiment 1-3 of the present invention.

FIG. 14 is a flowchart of a process for executing a previously provided application according to an embodiment 1-3 of the present invention.

Figure 15:
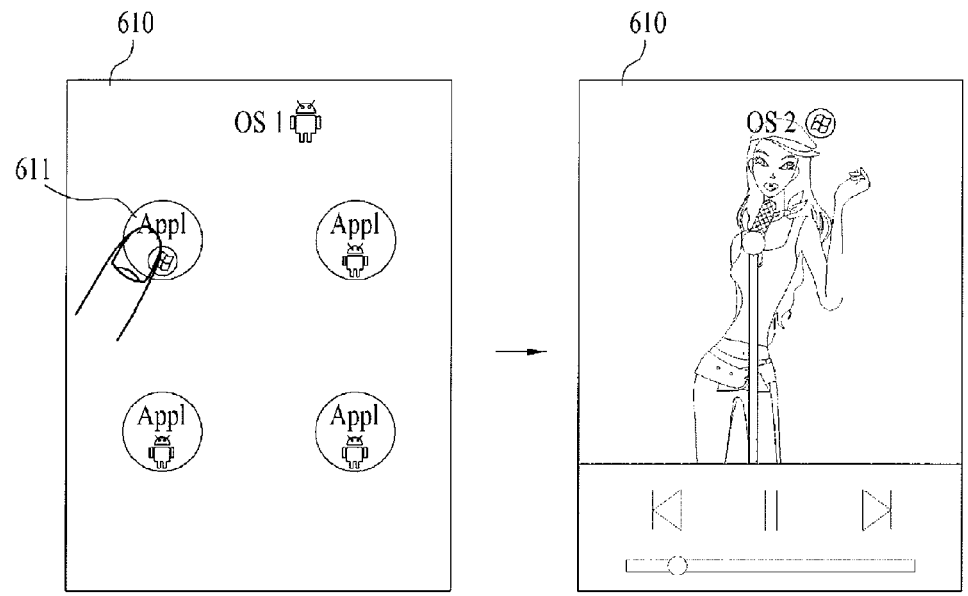
FIG. 15 is a diagram of screen configurations of a process for executing a previously provided application according to an embodiment 1-3 of the present invention.
Figure 15:
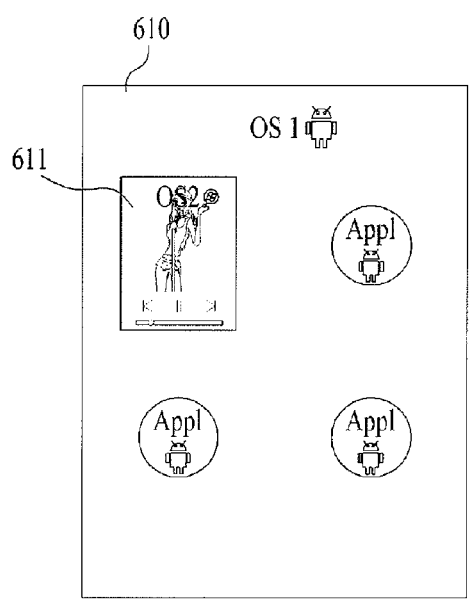
Figure 15:
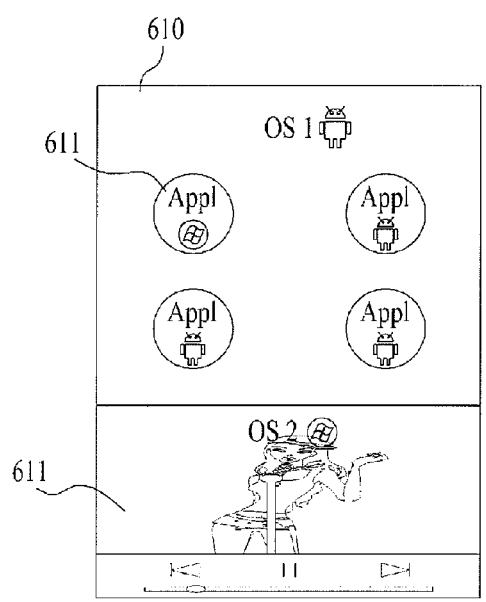

FIG. 15 is a diagram of screen configurations of a process for executing a previously provided application according to an embodiment 1-3 of the present invention.

Referring to FIG. 14 and FIG. 15, the controller 180 displays a dedicated screen 610 of a previously ser first OS among operating systems provided within the memory 160 [S171]. And, the controller 180 controls applications executable in an environment of the first OS and an application 611 inexecutable in the first OS environment to be displayed within the first OS dedicated screen 610 [S172] [FIG. 15 (a)].

In this case, the application 611 inexecutable in the first OS environment can include the application obtained in the aforesaid embodiment.

The first OS dedicated screen 610 displayed in the step S171 or S172 can be set by a user. Alternatively, the first OS dedicated screen 610 displayed in the step S171 or S172 can include a screen finally displayed before the driving of the screen of the touchscreen 151 is turned off. Alternatively, the first OS dedicated screen 610 displayed in the step S171 or S172 can include a screen finally displayed before the driving of the mobile terminal 100 is turned off. Alternatively, the first OS dedicated screen 610 displayed in the step S171 or S172 can include a screen most frequently used among the dedicated screens of the entire operating systems.

Before the first OS dedicated screen 610 displayed in the step S171 or S172 is displayed, the controller 180 simultaneously drives the entire operating systems provided to the memory 160 or can drive the first OS only.

Meanwhile, the controller 180 detects whether an application 611 to execute is selected from the first OS dedicated screen 610 [S173].

If the application 611 to execute is selected [S174], the controller 180 determines whether an execution of the selected application 611 is possible in a current first OS environment [S175].

As a result of the determination in the step S175, if the corresponding execution is possible in an environment of the first OS, the controller 180 executes a function of the selected application 611 [S177].

As a result of the determination in the step S175, if the corresponding execution is not possible in an environment of the first OS [S176], the controller 180 searches the operating systems provided to the memory 160 for a second OS available for the execution of the selected application 611 [S178].

Subsequently, the controller 180 executes the selected application 611 by activating the found second OS [S179].

In this case, referring to FIG. 15 (b), if the second OS is activated, the controller 180 switches the first OS dedicated screen 610 to a dedicated screen of the activated second OS and is then able to control the executed screen 611 of the application on the second OS dedicated screen. In this case, while both of the first Os and the second OS are being driven, their dedicated screens can be switched to each other only. Alternatively, the second OS available for the execution of the application 611 is driven, whereas the driving of the first OS unavailable for the execution of the first application 611 is turned off.

Moreover, referring to FIG. 15 (c), if the second OS is activated, the controller 180 displays the dedicated screen of the second OS on the first OS dedicated screen 610 by PIP (picture in picture) and is able to display the executed screen 611 of the application within the second OS dedicated screen. In this case, both of the first OS and the second OS can be driven. In doing so, the second OS dedicated screen is displayed as thumbnail, popup or the like on the first OS dedicated screen.

Alternatively, referring to FIG. 15 (d), if the second OS is activated, the controller 180 partitions the screen of the touchscreen 151 into a plurality of regions including a first region and a second region at least. The controller 180 displays the first OS dedicated screen 610 on the first region, displays a dedicated screen of the second OS on the second region, and is able to display the executed screen 611 of the application within the second OS dedicated screen.

Meanwhile, referring to FIG. 15 (b) to FIG. 15 (d), the controller 180 is able to display information indicating the corresponding OS within the executed screen 611 of the application.

After the execution of the application has bee terminated, if the first OS dedicated screen 610 shown in FIG. 14 (a) is displayed, the controller 180 is able to display information indicating the corresponding OS within an icon indicating the execution terminated application.

Besides, if at least two operating systems enabling an execution of the application 611 are found in the step S178, the controller 180 is able to perform a process for executing the application 611 in the following manner according to an embodiment 1-4.

Embodiment 1-4

An embodiment 1-4 of the present invention relates to a process for executing the application 611 if at least two operating systems enabling an execution of the application 611 are found in the step S178 of the former embodiment 1-3.

In the following description, the embodiment 1-4 of the present invention is explained with reference to FIG. 16 and FIG. 17.

Figure 16:
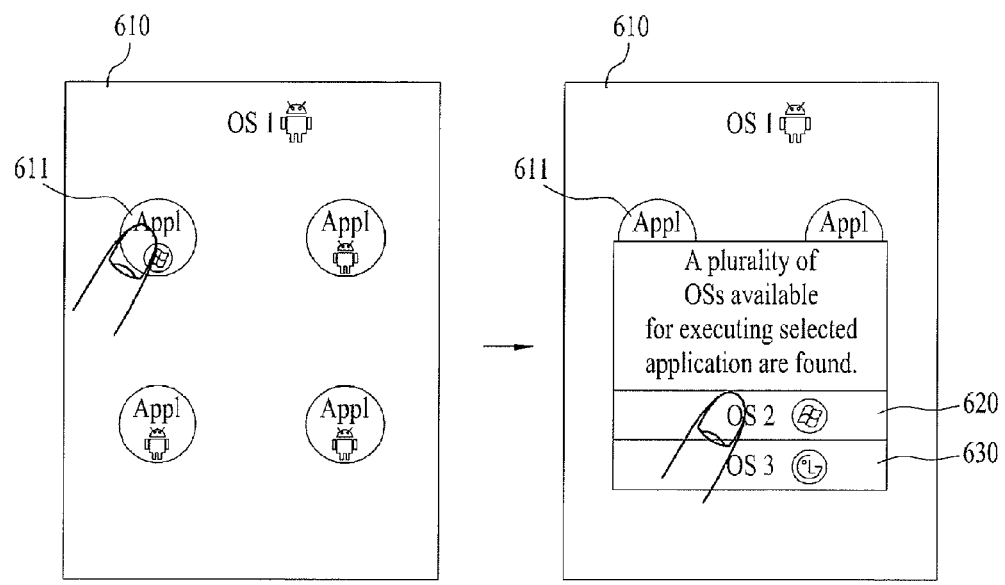
FIG. 16 and FIG. 17 are diagrams of screen configurations of a process for executing an application in case that at least two operating systems enabling an execution of an application are found according to an embodiment 1-4 of the present invention.
Figure 16:
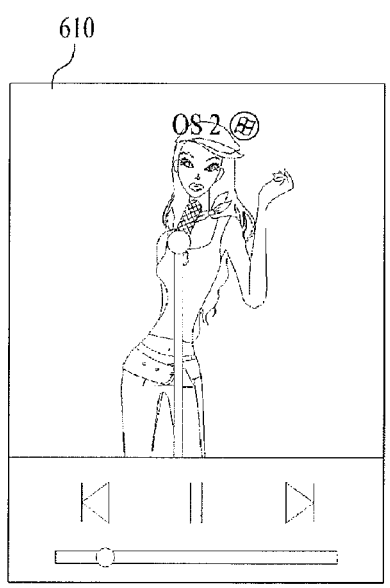
Figure 16:
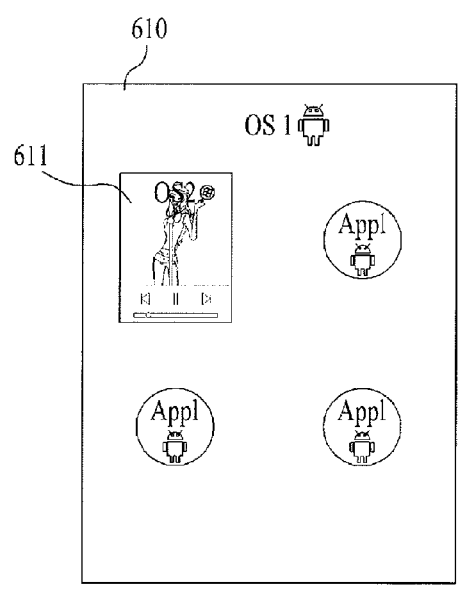
Figure 17:
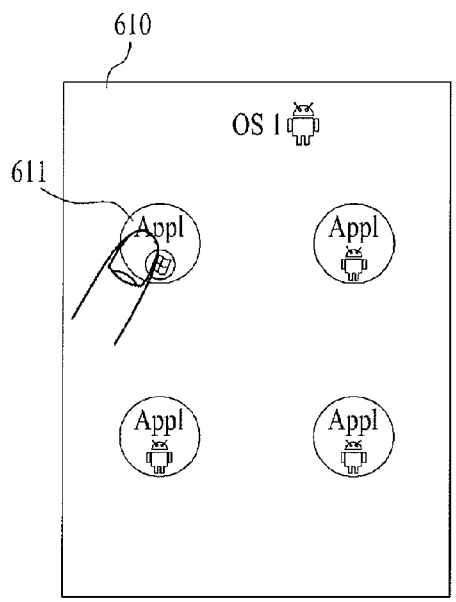
Figure 17:
Figure 17:
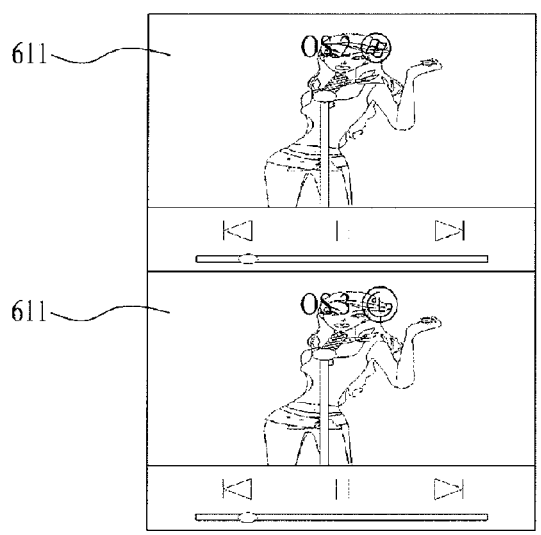

FIG. 16 and FIG. 17 are diagrams of screen configurations of a process for executing an application in case that at least two operating systems enabling an execution of an application are found according to an embodiment 1-4 of the present invention.

Referring to FIG. 16 (a), if an application 611 impossible to be executed in the first OS environment is selected, the controller 180 searches the memory 160 for at least one OS available for an execution of the application 611.

Referring to FIG. 16 (b), if at least two operating systems available for the execution of the application 160 are found from the memory 160, the controller 180 controls a list 710 of the found operating systems to be displayed within the first OS dedicated screen 610.

If a specific second OS is selected from the list 710 of the operating system, referring to FIG. 16 (c) and FIG. 16 (d), the controller 180 displays a dedicated screen of the selected second OS and also displays an executed screen 611 of the application on the second OS dedicated screen.

In particular, referring to FIG. 16 (c), if the second OS is selected as an OS for executing the application 611 from the list 710, the controller 180 switches the first OS dedicated screen to a dedicated screen of the selected second OS and then displays an executed screen of the corresponding application 611.

Alternatively, referring to FIG. 16 (d), if the second OS is selected as an OS for executing the application 611 from the list 710, the controller 180 displays a dedicated screen of the selected second OS on the first OS dedicated screen by PIP and then displays an executed screen of the corresponding application 611 on the second OS dedicated screen displayed by PIP.

Referring to FIG. 17 (a), if an application 611 inexecutable in the first OS environment is selected, the controller 180 searches the memory 160 for at least one OS enabling an execution of the application 611.

Referring to FIG. 17 (b), if at least two operating systems enabling the execution of the application 611 are found from the memory 160, the controller 180 partitions the screen of the touchscreen 151 into a plurality of regions including a first region and a second region at least and then displays executed screens of the found operating systems on the first region and the second region, respectively.

Besides, if the operating system enabling the execution of the application 611 is not found in the step S178, the controller 180 is able to perform a process for executing the application 611 in the following manner according to an embodiment 1-5.

Embodiment 1-5

An embodiment 1-5 of the present invention relates to a process for executing the application 611 if the OS enabling an execution of the application 611 is not found in the step S178 of the former embodiment 1-3.

In the following description, the embodiment 1-5 of the present invention is explained with reference to FIGS. 18 to 20.

Figure 18:
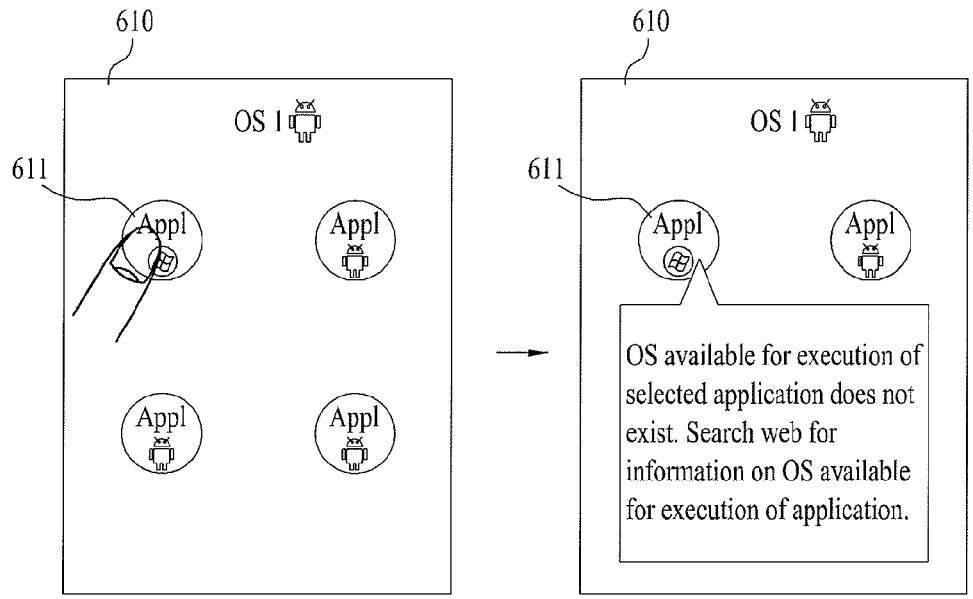
FIGS. 18 to 20 are diagrams of screen configurations of a process for executing an application in case that any operating system enabling an execution of an application is not found according to an embodiment 1-5 of the present invention.
Figure 18:
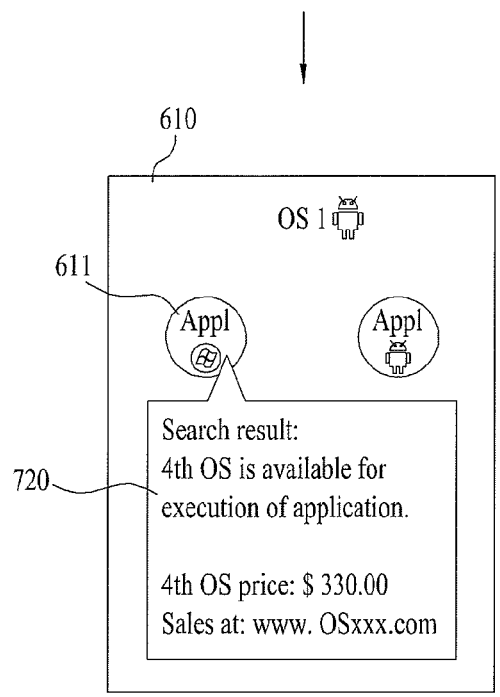
Figure 19:
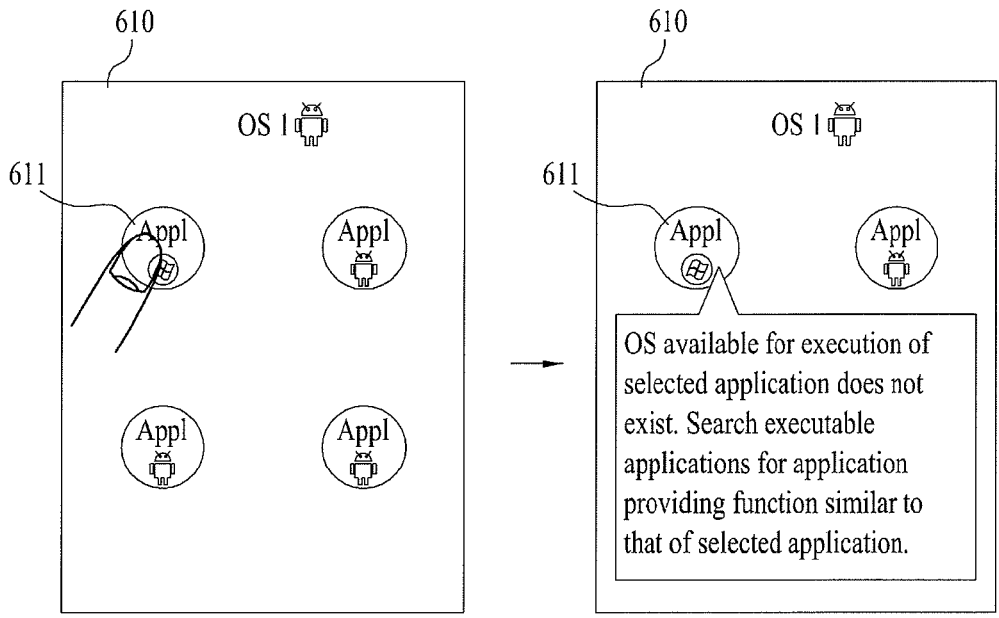
Figure 19:
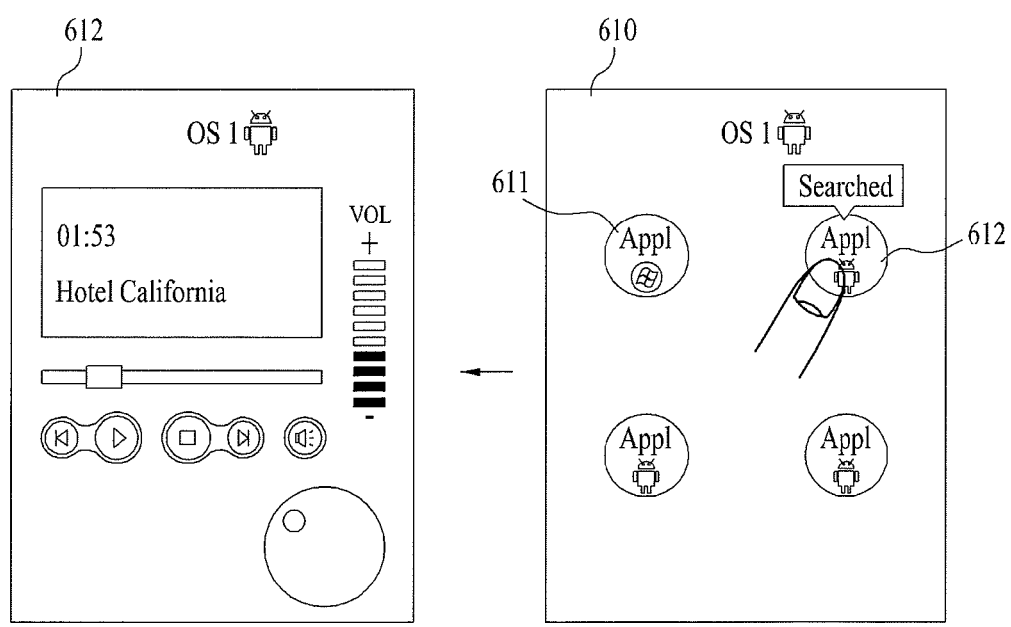
Figure 20:
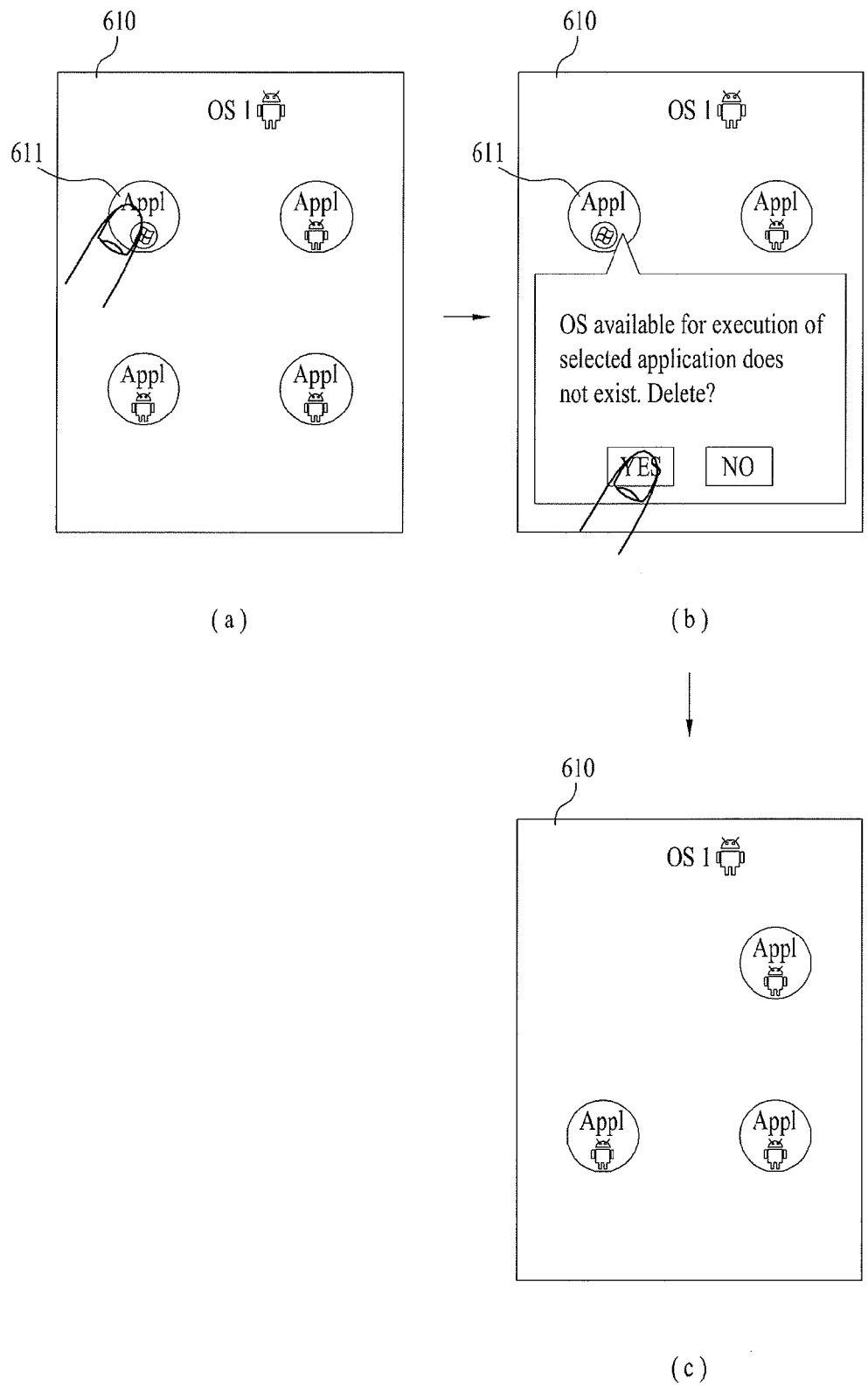

FIGS. 18 to 20 are diagrams of screen configurations of a process for executing an application in case that any operating system enabling an execution of an application is not found according to an embodiment 1-5 of the present invention.

Referring to FIG. 18 (a), if an application 611 impossible to be executed in the first OS environment is selected, the controller 180 searches the memory 160 for at least one OS available for an execution of the application 611.

Referring to FIG. 18 (b), if operating systems enabling an execution of the application 611 do not exist in the memory 160, the controller 180 accesses a website providing information on various operating systems via the wireless communication unit 110. Referring to FIG. 18 (c), the controller 180 searches the accessed website for information 720 on the OS available for the execution of the application 611 and then displays the found information 720.

In doing so, in case of searching the website for the information 720 on the OS available for the execution of the application 611, the controller 180 is able to perform the search by utilizing a name of the application 611 as a search word.

Referring to FIG. 19 (a), if the application impossible for the execution in the first OS environment is selected, the controller 180 searches the memory 160 for at least one OS available for the execution of the application 611.

Referring to FIG. 19 (b), if operating systems available for the execution of the application 611 do not exist in the memory 160, the controller 180 searches the entire applications provided to the memory 160 for at least one application 612 having the function equal or similar to that of the application 611. In doing so, in case of searching the memory 160 for the application having the function equal or similar to that of the application 611, the controller 180 is able to search for the application having the same category to which the function of the application 611 belongs. For instance, if the application 611 is a video play application, it can be observed that the video playback belongs to a multimedia category. The controller 180 then searches the applications in the memory 160 for the application having the function belonging to the multimedia category.

Referring to FIG. 19 (c), if the application 612 having the function equal or similar to that of the former application 611 is found from the memory 160, the controller 180 displays the found application 612 within the first OS dedicated screen 610. If the found application 612 is selected, referring to FIG. 19 (d), the controller 180 executes the selected application 612.

Referring to FIG. 20 (a), if an application 611 impossible to be executed in the first OS environment is selected, the controller 180 searches the memory 160 for at least one OS available for an execution of the application 611.

Referring to FIG. 20 (b), if operating systems enabling an execution of the application 611 do not exist in the memory 160, the controller 180 displays a delete setting window for setting whether to delete the application 611.

Subsequently, if it is determined to delete the application 611 via the delete setting window, referring to FIG. 20 (c), the controller 180 deletes the application 611 from the first OS dedicated screen 610.

In the foregoing descriptions, the first embodiment of the present invention has been explained in detail with reference to FIGS. 6 to 20.

In the following description, a second embodiment of the present invention shall be explained in detail with reference to FIG. 21 and FIG. 22.

Second Embodiment

According to a second embodiment of the present invention, when a specific multimedia content is selected from a screen, applications dedicated to each OS available for an execution of the application are displayed. If a specific application is selected, a current OS is switched to an OS of the selected application to execute the corresponding application.

In the following description, a process for the controller 180 to execute a content is explained with reference to FIG. 21 and FIG. 22.

Figure 21:
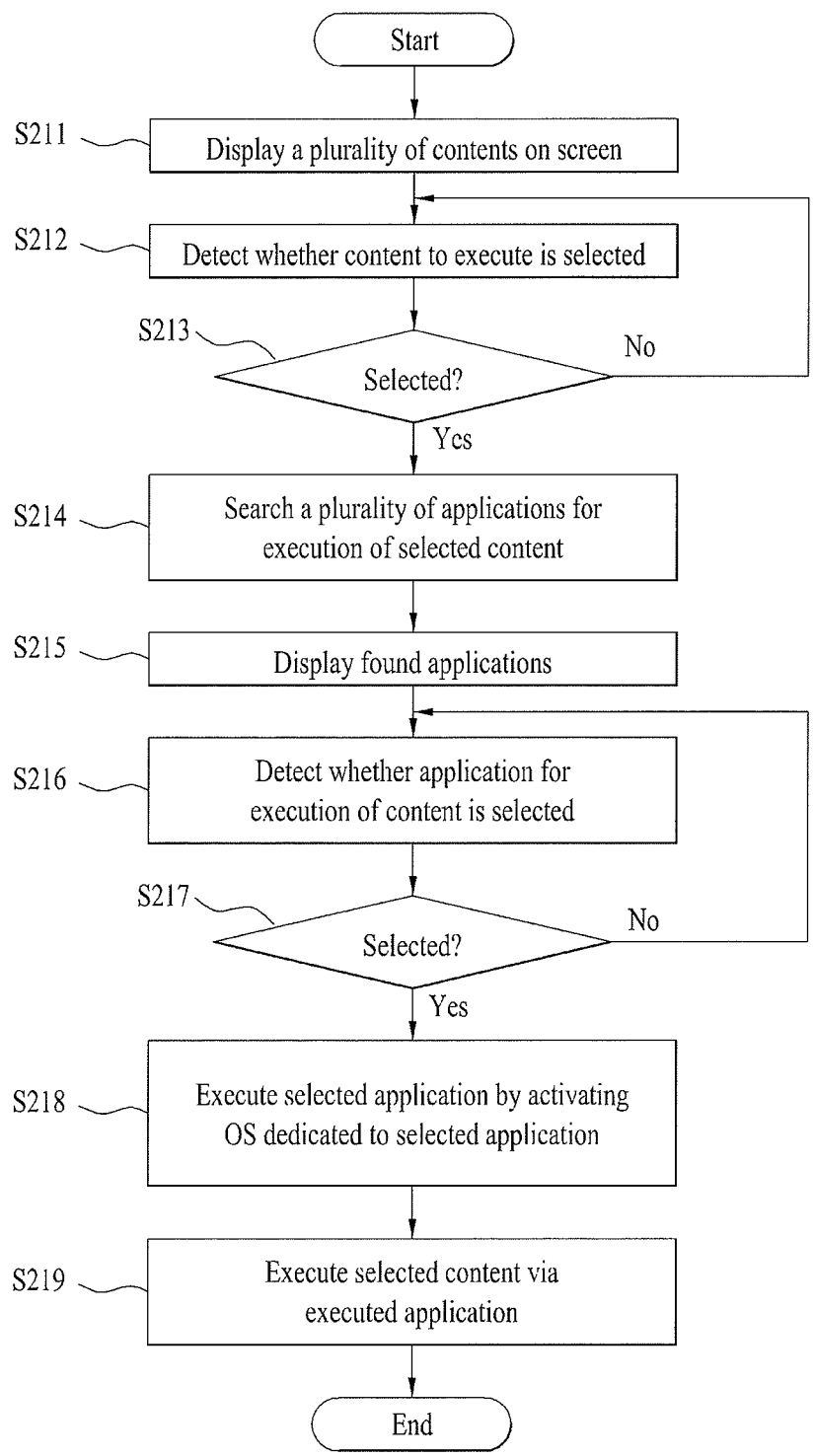
FIG. 21 is a flowchart of a process for executing a content according to a second embodiment of the present invention.

FIG. 21 is a flowchart of a process for executing a content according to a second embodiment of the present invention.

FIG. 22 is a diagram of screen configurations of a process for executing a content according to a second embodiment of the present invention.

Referring to FIG. 21 and FIG. 22, the controller 180 displays a plurality of contents on a dedicated screen 810 of a specific first OS among entire operating systems provided to the memory 160 [S211] [FIG. 22 (a). In this case, each of the contents is the data for multimedia and can include data playable for image, video, music, broadcast or the like.

Before the first OS dedicated screen 810 is displayed in the step S211, the controller 180 simultaneously drives the entire operating systems provided to the memory 160 or is able to drive the first OS only.

Subsequently, the controller 180 detects whether a content 811 to play is selected from the first OS dedicated screen 810 [S212].

If the content 811 to play is selected [S213], the controller 180 searches the memory 160 for applications 911 and 912 available for an execution of the selected content 811 [S214] and then displays a list 910 of the found applications 911 and 912 [S215] [FIG. 22 (b)].

The controller detects whether the application 911 for the execution of the content 811 is selected from the list 910 [S216].

If the application 911 for the execution of the content 811 is selected from the list 910 [S217] [FIG. 22 (b)], the controller 180 activates a second OS dedicated to the selected application 911 and then executes the application 911 in an environment of the activated second OS [S218].

In doing so, while both of the first and second operating systems are driven, the controller 180 is able to display an executed screen of the application 911 by switching a first OS dedicated screen to a second OS dedicated screen. Alternatively, the controller 180 drives the second OS available for the execution of the application 911 but turns off the driving of the first OS unavailable for the execution of the application 911.

Finally, the controller executes he selected content 811 via the executed application 911 [S219] [FIG. 22 (c)].

Accordingly, the present invention provides the following effects and/or advantages.

First of all, the present invention executes an application inexecutable in a current OS by switching the current OS to another OS available for an execution of the corresponding application, thereby preventing application execution errors and providing a quick application execution to a user.

Secondly, in case of playing a specific multimedia content, the present invention provides an application list dedicated to each OS for an execution of the content, thereby enabling a user to select and use an application fit for his taste.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
a memory including at least two OSs (Operating Systems) and a plurality of applications;
a display unit configured to display a plurality of icons corresponding to the plurality of applications on a dedicated screen of a first OS (Operating System) among the at least two OSs; and
a controller configured to
determine that an execution command for one of the plurality of applications is input to the dedicated screen of the first OS, the execution command being a user's touch to a corresponding one of the plurality of icons, and
based on the user's touch:
determine whether the first OS is able to execute the application if the execution command for the application is determined to have been input to the dedicated screen of the first OS, if the first OS is determined not to be able to execute the application, determine if a second OS capable of executing the application is among the at least two OSs in the memory, activate the second OS if the second OS is among the at least two OSs in the memory, execute the application via the activated second OS, and display the application executed via the activated second OS while displaying the dedicated screen of the first OS.

2. The mobile terminal of claim 1, wherein the controller is further configured to display the application executed via the activated second OS while displaying the dedicated screen of the first OS in a dedicated screen of the second OS by PIP (picture in picture) in the dedicated screen of the first OS after the second OS is activated, and execute the application in the dedicated screen of the second OS.

3. The mobile terminal of claim 1, wherein the controller is further configured to activate the second OS in the dedicated screen of the first OS while the first and second OSs are simultaneously driven.

4. The mobile terminal of claim 1, wherein the controller is further configured to stop driving the first OS after the second OS is activated.

5. The mobile terminal of claim 1, further comprising:

a wireless communication unit configured to access a website, download the application from the website and store the application in the memory.

6. The mobile terminal of claim 5, wherein the controller is further configured to display a screen corresponding to the accessed website, search the memory for the second OS if the application is selected from the website, and display information indicating the second OS.

7. The mobile terminal of claim 6, wherein the controller is configured to cause the information indicating the second OS to be stored in the memory together with the application.

8. The mobile terminal of claim 7, wherein, when the application is executed in the dedicated screen of the second OS, the controller is configured to cause the information indicating the second OS to be stored in the memory in a form capable of being displayed within an execution screen of the application.

9. The mobile terminal of claim 5, wherein the memory is configured to store an application list per OS, and wherein the controller is configured to cause the stored application to be added to an application list corresponding to the second OS.

10. The mobile terminal of claim 5, wherein the memory includes an application storage space per OS, and wherein the controller is configured to cause the application to be stored in an application storage space corresponding to the second OS.

11. The mobile terminal of claim 1, wherein, if the second OS for executing the application is not found in the memory, the controller is configured to search for and display information identifying the second OS.

12. A method of controlling a mobile terminal including a memory provided with at least two operating systems and a plurality of applications, the method comprising:

displaying a plurality of icons corresponding to the plurality of applications on a dedicated screen of a first OS (Operating System) among the at least two OSs (Operating Systems);

determining that an execution command for one of the plurality of applications is input to the dedicated screen of the first OS, the execution command being a user's touch to a corresponding one of the plurality of icons; and based on the user's touch:

determining whether the application is executable in the first OS if the execution command for the application is determined to have been input to the dedicated screen of the first OS;

if the first OS is determined not to be able to execute the application, determining if a second OS capable of executing the application is among the at least two OSs in the memory;

activating the second OS if the second OS is among the at least two OSs in the memory;

executing the application via the activated second OS; and displaying the application executed via the activated second OS while displaying the dedicated screen of the first OS.

13. The method of claim 12, the executing step includes:

displaying the application executed via the activated second OS while displaying the dedicated screen of the first OS in a dedicated screen of the second OS by PIP (picture in picture) in the first OS dedicated screen after the second OS is activated; and executing the application in the second operating system dedicated screen.

14. The method of claim 12, the executing step comprising activating the second OS in the dedicated screen of the first OS while the first and second OSs are simultaneously driven.

15. The method of claim 12, the executing step comprising the steps of:

stopping the driving the first OS after the second OS is activated.

16. A mobile terminal, comprising:

a memory including at least two OSs (Operating Systems) and a plurality of applications;

a display unit configured to display a plurality of icons corresponding to the plurality of applications on a dedicated screen of a first OS (Operating System) among the at least two OSs; and a controller configured to determine that an execution command for one of the plurality of applications is input to the dedicated screen of the first OS, the execution command being a user's touch to a corresponding one of the plurality of icons, and based on the user's touch:

determine whether the first OS is able to execute the application if the execution command for the application is determined to have been input to the dedicated screen of the first OS, if the first OS is determined not to be able to execute the application, determine if a second OS capable of executing the application is among the at least two OSs in the memory, activate the second OS if the second OS is among the at least two OSs in the memory, switch the dedicated screen of the first OS to a dedicated screen of the second OS after the second OS is activated, and execute the application in the dedicated screen of the second OS.

17. A method of controlling a mobile terminal including a memory provided with at least two operating systems and a plurality of applications, the method comprising:
- displaying a plurality of icons corresponding to the plurality of applications on a dedicated screen of a first OS (Operating System) among the at least two OSs (Operating Systems);
- determining that an execution command for one of the plurality of applications is input to the dedicated screen of the first OS, the execution command being a user's touch to a corresponding one of the plurality of icons; and
- based on the user's touch:
  - determining whether the application is executable in the first OS if the execution command for the application is determined to have been input to the dedicated screen of the first OS;
  - if the first OS is determined not to be able to execute the application, determining if a second OS capable of executing the application is among the at least two OSs in the memory;
  - activating the second OS if the second OS is among the at least two OSs in the memory;
  - switching the dedicated screen of the first OS to a dedicated screen of the second OS after the second OS is activated; and
  - executing the application in the second OS dedicated screen.

* * * * *